(12) United States Patent
Yamada et al.

(10) Patent No.: US 12,531,284 B2
(45) Date of Patent: *Jan. 20, 2026

(54) WIRELESS RECHARGEABLE SOLID-STATE BATTERY MODULE

(71) Applicant: Murata Manufacturing Co., Ltd., Kyoto-fu (JP)

(72) Inventors: Kiyokazu Yamada, Nagaokakyo (JP); Tatsuya Hosotani, Nagaokakyo (JP); Tomohiro Kato, Nagaokakyo (JP); Mitsuyoshi Nishide, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 937 days.

This patent is subject to a terminal disclaimer.

(21) Appl. No.: 17/716,294

(22) Filed: Apr. 8, 2022

(65) Prior Publication Data

US 2022/0231539 A1    Jul. 21, 2022

Related U.S. Application Data

(63) Continuation of application No. PCT/JP2020/023356, filed on Jun. 15, 2020.

(30) Foreign Application Priority Data

Oct. 11, 2019   (JP) ................................ 2019-188229

(51) Int. Cl.
*H02J 7/00*    (2006.01)
*H01M 10/0525*    (2010.01)
(Continued)

(52) U.S. Cl.
CPC ....... *H01M 10/46* (2013.01); *H01M 10/0525* (2013.01); *H01M 10/4257* (2013.01);
(Continued)

(58) Field of Classification Search
USPC ........................................................ 320/104
See application file for complete search history.

(56) References Cited

U.S. PATENT DOCUMENTS

| 9,484,737 B2 * | 11/2016 | Kim ..................... H02H 7/1252 |
| 2013/0011700 A1 * | 1/2013 | Park ..................... H01M 50/247 |
| | | 429/7 |

(Continued)

FOREIGN PATENT DOCUMENTS

| JP | 2004-146297 A | 5/2004 |
| JP | 2005-176551 A | 6/2005 |

(Continued)

OTHER PUBLICATIONS

International Search Report issued in PCT/JP2020/023356; mailed Aug. 4, 2020.

*Primary Examiner* — Samuel Berhanu
(74) *Attorney, Agent, or Firm* — Studebaker Brackett PLLC

(57) ABSTRACT

A wireless rechargeable solid-state battery module includes a solid-state battery; internal structures that are provided with an internal circuit electrically connected with the solid-state battery; a barrier layer that isolates the solid-state battery from an outside air environment; and a positive electrode terminal and a negative electrode terminal each of which is electrically connected with the solid-state battery, is exposed on an outer surface, and is arranged so that the positive electrode terminal or the negative electrode terminal can be mounted on a mounting board. The internal circuit includes a wireless charging circuit that receives power from an outside via an electromagnetic field or a magnetic field produced by power transmission from the outside and controls charging to the solid-state battery.

24 Claims, 16 Drawing Sheets

(51) Int. Cl.
- *H01M 10/42* (2006.01)
- *H01M 10/46* (2006.01)
- *H01M 10/48* (2006.01)
- *H01M 50/124* (2021.01)
- *H01M 50/14* (2021.01)
- *H02J 50/10* (2016.01)

(52) U.S. Cl.
CPC ....... *H01M 10/4264* (2013.01); *H01M 10/48* (2013.01); *H01M 50/1243* (2021.01); *H01M 50/14* (2021.01); *H02J 7/00304* (2020.01); *H02J 7/00308* (2020.01); *H02J 7/00309* (2020.01); *H02J 7/0068* (2013.01); *H02J 50/10* (2016.02); *H01M 2010/4271* (2013.01)

(56) References Cited

U.S. PATENT DOCUMENTS

| | | | |
|---|---|---|---|
| 2016/0118820 A1* | 4/2016 | Tsujiko | H02J 7/00302 320/148 |
| 2018/0040910 A1* | 2/2018 | Chung | H01M 4/139 |
| 2018/0375347 A1* | 12/2018 | Ryou | G09F 9/30 |
| 2020/0350613 A1* | 11/2020 | Kato | H01M 10/0562 |

FOREIGN PATENT DOCUMENTS

| | | |
|---|---|---|
| JP | 2010-029006 A | 2/2010 |
| JP | 2013-165584 A | 8/2013 |
| JP | 2015-088376 A | 5/2015 |
| JP | 5798407 B2 | 10/2015 |
| JP | 2019-507564 A | 3/2019 |
| JP | 2019-110760 A | 7/2019 |
| WO | 2019/164006 A1 | 8/2019 |

\* cited by examiner

Q61  Q62

POWER TRANSMISSION DEVICE

POWER TRANSMISSION DEVICE

WIRELESS RECHARGEABLE SOLID-STATE BATTERY MODULE

CROSS-REFERENCE TO RELATED APPLICATIONS

This application claims benefit of priority to International Patent Application No. PCT/JP2020/023356, filed Jun. 15, 2020, and to Japanese Patent Application No. 2019-188229, filed Oct. 11, 2019, the entire contents of each are incorporated herein by reference.

BACKGROUND

Technical Field

The present disclosure relates to a module including a solid-state battery.

Background Art

Japanese Patent No. 5798407 suggests a non-contact charging type secondary battery in which a secondary battery and a wireless power transmission circuit are provided in a casing. In specific, the non-contact charging type secondary battery includes: an alkaline secondary battery; a power receiving circuit including power receiving coils and a resonant capacitor connected to the power receiving coils in parallel and receiving alternate current power via a magnetic field from a power transmission device; a rectifier circuit for rectifying alternate current power received by the power receiving circuit; a current limit circuit for limiting a charging current from the rectifier circuit to the alkaline secondary battery; and an external body having a columnar shape and containing a positive electrode terminal and a negative electrode terminal that are connected to the alkaline secondary battery. The configuration is described in which the power receiving coils are provided along an inner circumferential surface of the external body.

SUMMARY

The non-contact charging type secondary battery described in Japanese Patent No. 5798407 is assumed to be an alkaline secondary battery that has a cylindrical casing and is substitutable for a dry cell battery. Such a non-contact charging type secondary battery cannot be downsized and is hard to be mounted on a small device such as a wearable device.

On the other hand, as a device is smaller such as a hearing aid, it becomes harder to handle a battery as a single body. Therefore, highly-flexible charging is desired to be achieved.

For this reason, the present disclosure provides a downsized wireless rechargeable solid-state battery module that is capable of performing wireless charging in any state of being single, being mounted on a circuit board, and being mounted on a device.

A wireless rechargeable solid-state battery module as an example of the present disclosure includes a solid-state battery; an internal structure that is provided with an internal circuit electrically connected with the solid-state battery; a positive electrode terminal and a negative electrode terminal each of which is electrically connected with the solid-state battery, is exposed on an outer surface, and is arranged so that the positive electrode terminal or the negative electrode terminal can be mounted on a mounting board; and a barrier layer that isolates the solid-state battery from an outside air environment. The internal circuit includes a wireless charging circuit that receives power from an outside via a power transmission magnetic field and controls charging to the solid-state battery.

According to the present disclosure, a wireless rechargeable solid-state battery module is obtained that is capable of performing wireless charging in any state of being single, being mounted on a circuit board, and being mounted on a device.

The electronic circuit board on which the wireless rechargeable solid-state battery module according to the present disclosure is mounted can receive power from the outside via an electromagnetic field or a magnetic field produced by power transmission from the outside, with the wireless rechargeable solid-state battery module. This eliminates a need for configuring a wireless charging circuit on the electronic circuit board. Further, a solid-state battery and a wireless charging circuit can be mutually connected with short wiring, being able to reduce power loss in wiring and suppress malfunction caused by an external magnetic field. Furthermore, reduction in size, weight, and thickness and higher efficiency of the mounting electronic circuit board can be achieved. Also, the mounting electronic circuit board itself can be used as a mounting electronic circuit board provided with an all-solid-state battery and having a wireless charging function, being able to achieve reduction in size and weight and higher efficiency in electronic and electrical devices.

BRIEF DESCRIPTION OF THE DRAWINGS

FIG. 15 is another circuit diagram of the wireless rechargeable solid-state battery module and the like;

DETAILED DESCRIPTION

Figure 1:
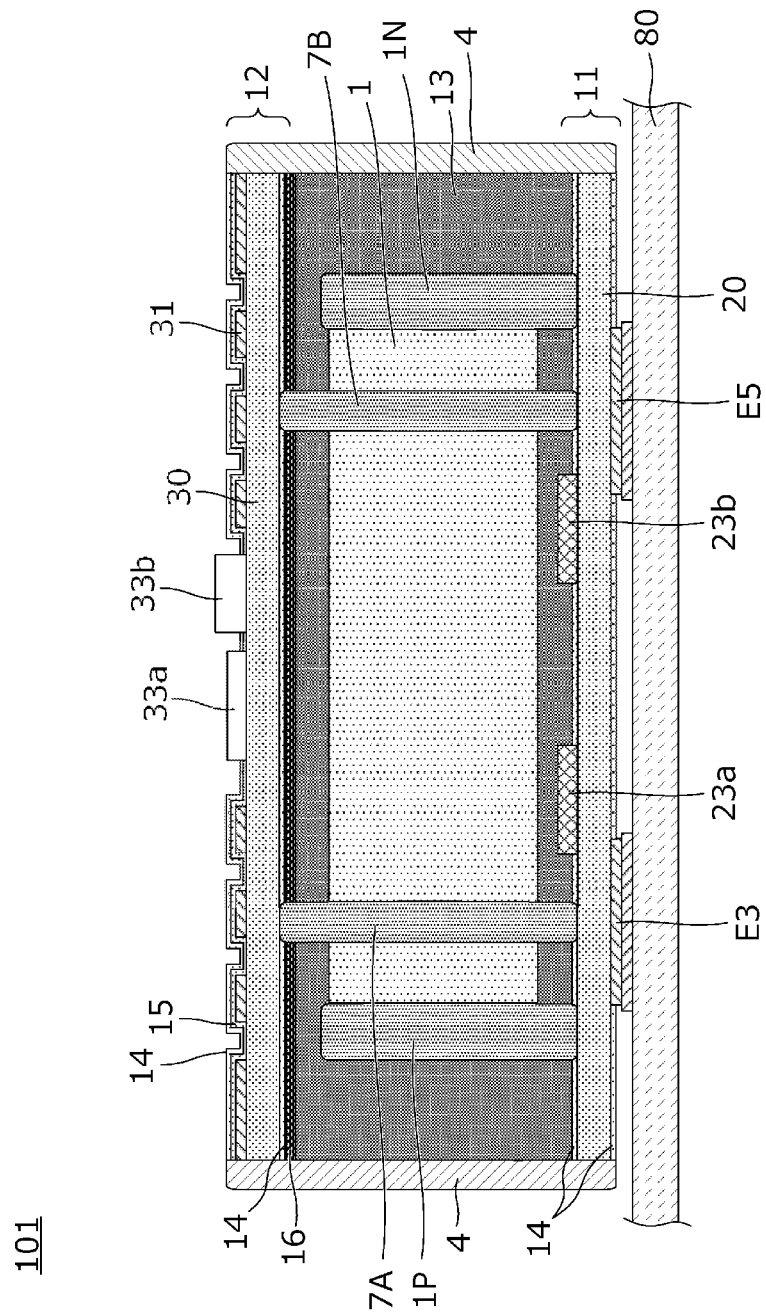
FIG. 1 is a sectional view of a wireless rechargeable solid-state battery module according to a first embodiment.

Hereinafter, a plurality of embodiments for carrying out the present disclosure will be described with some specific examples referring to the accompanying drawings. The same reference characters are given to the same components among the drawings. For convenience of explanation of the embodiments, description will be provided separately in a plurality of embodiments so as to focus on explaining main points or facilitating understanding, but it is possible to make partial replacement or combination of configurations described in different embodiments. The second and following embodiments will omit the description of matters common to those of the first embodiment and describe only different points. In particular, the same advantageous effects obtained with the same configurations will not be sequentially mentioned in each embodiment.

First Embodiment

FIG. 1 is a sectional view of a wireless rechargeable solid-state battery module 101 according to a first embodiment. The wireless rechargeable solid-state battery module 101 includes a solid-state battery 1, internal structures 11 and 12, barrier layers 14, a positive electrode terminal E3, and a negative electrode terminal E5. The barrier layers 14 isolate the solid-state battery 1 from the outside air environment. Each of the positive electrode terminal E3 and the negative electrode terminal E5 is electrically connected with the solid-state battery 1 and is exposed on an outer surface of the wireless rechargeable solid-state battery module 101.

The internal structures 11 and 12 are arranged on positions sandwiching the solid-state battery 1 in a laminating direction thereof, and the internal structures 11 and 12 are overlapped with the solid-state battery 1 when viewed in this laminating direction. The internal structures 11 and 12 are provided with an internal circuit that is electrically connected with the solid-state battery 1. On the both surfaces of each of the internal structures 11 and 12, the barrier layers 14 are respectively provided. A magnetic layer 16 is provided on a lower surface (a surface on the solid-state battery 1 side) of the internal structure 12.

The positive electrode terminal E3 and the negative electrode terminal E5 are arranged together with other terminals so as to be able to be mounted on a mounting board 80. That is, the positive electrode terminal E3 and the negative electrode terminal E5 are arranged on a surface (lower surface) facing the mounting board 80. On the mounting board 80, a circuit using the wireless rechargeable solid-state battery module 101 as a power supply module is configured.

The internal circuit mentioned above includes a wireless charging circuit that receives power from the outside via a power transmission magnetic field and controls charging to the solid-state battery 1.

A buffer layer 15 is formed between the upper surface of the internal structure 12 and the barrier layer 14. The buffer layer 15 suppresses peeling of the barrier layer 14.

The internal structure 11 is composed of a first circuit board 20 on which a plurality of electronic components are mounted, and the internal structure 12 is composed of a second circuit board 30 on which a plurality of electronic components are mounted. The first circuit board 20 and the second circuit board 30 are positioned to sandwich the solid-state battery 1 in the laminating direction.

The solid-state battery 1 is a battery which has a rectangular parallelepiped outer shape, and in the direction shown in FIG. 1, a positive electrode 1P and a negative electrode 1N are respectively formed on the left side surface and the right side surface. The periphery of the solid-state battery 1 is filled with a mold resin portion 13 in a state in which the solid-state battery 1 is interposed between the first circuit board 20 and the second circuit board 30. The mold resin portion 13 is made of polyimide, for example, and enhances impact resistance of the solid-state battery 1. The mold resin portion 13 corresponds to an "impact absorbing member" according to the present disclosure.

The first circuit board 20 is a low temperature co-fired ceramics (LTCC) board, for example. Alternatively, a high temperature co-fired ceramics (HTCC) board may be employed. As merely an example, the thickness of the first circuit board 20 may be from 20 μm to 1000 μm inclusive and is, for example, from 100 μm to 300 μm inclusive.

Electronic components 23a and 23b and the like are mounted on an inner surface (a surface on the solid-state battery 1 side) of the first circuit board 20.

The second circuit board 30 is, for example, a polyimide (PI)-based or polyethylene terephthalate (PET)-based flexible board, or a liquid crystal polymer (LCP)-based flexible resin board. As merely an example, the thickness of the second circuit board 30 may be from 20 μm to 1000 μm inclusive and is, for example, from 100 μm to 300 μm inclusive.

Figure 5:
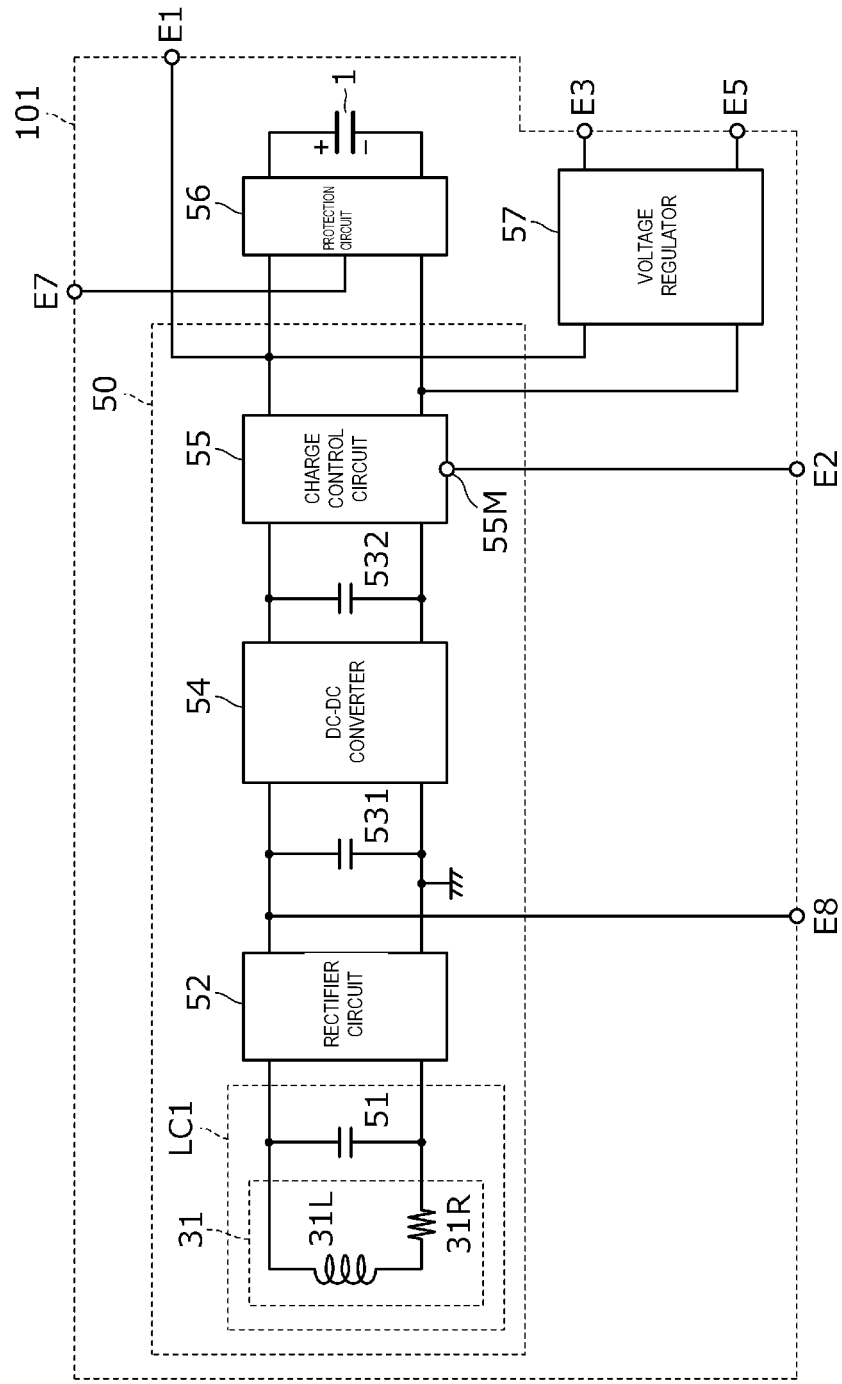
FIG. 5 is a circuit diagram of the wireless rechargeable solid-state battery module.

On an outer surface (an opposite surface to a surface facing the solid-state battery 1) of the second circuit board 30, a power receiving coil 31 and the like are formed. Electronic components 33a and 33b and the like such as a DC-DC converter IC and a capacitor are mounted on the outer surface of the second circuit board 30. On this second circuit board 30, the power receiving coil 31, a rectifier circuit 52, and a DC-DC converter 54, which are illustrated in FIG. 5, are configured. Other circuit units are configured on the first circuit board 20.

The magnetic layer 16 acts as a magnetic path for a magnetic flux passing through a coil opening of the power receiving coil 31 and acts as a shielding member that magnetically shields the solid-state battery 1. The provision of the magnetic layer 16 facilitates magnetic field coupling between the power receiving coil 31 and a power transmission coil of a power transmission device. Further, it is possible to suppress eddy current generated in a conductor portion of the solid-state battery 1 in reception of a magnetic field from the power transmission coil.

Between the first circuit board 20 and the second circuit board 30, wirings 7A and 7B are formed. The wirings 7A and 7B are conductor portions obtained by Ag paste printing. An interval between the first circuit board 20 and the second circuit board 30 may be, for example, from 3 mm to 10 mm inclusive and is, for example, 5 mm.

On lateral surfaces of the wireless rechargeable solid-state battery module 101, metal thin films 4 such as copper foils are formed in a film coating manner.

The positive electrode terminal E3 and the negative electrode terminal E5 that are formed on the outer surface (lower surface) of the first circuit board 20 are connected to a pad electrode, which is formed on the mounting board 80, via solder or the like. The wireless rechargeable solid-state battery module 101 is thus surface-mounted on the mounting board 80.

The "solid-state battery" in the present disclosure indicates a battery whose components are made of solids in a broad sense, and indicates an all-solid-state battery whose components (especially preferably all components) are made of solids in a narrow sense. In a favorable aspect, the solid-state battery of the present disclosure is a laminate type solid-state battery configured so that layers serving as battery constituting units are mutually laminated, and each of the layers is preferably made of a sintered body.

Figure 2:
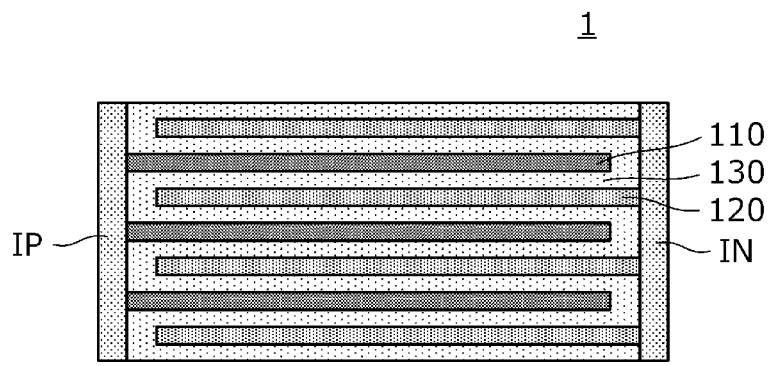
FIG. 2 is a sectional view illustrating a basic configuration of a solid-state battery according to the first embodiment.

FIG. 2 is a sectional view illustrating a basic configuration of the solid-state battery 1 according to the present embodiment. The configuration of the solid-state battery described here is merely an example for facilitating understanding of the disclosure and does not limit the disclosure.

[Basic Configuration of Solid-State Battery]

As illustrated in FIG. 2, the solid-state battery 1 has a solid-state battery multilayer body in which a plurality of battery constituting units, each of which includes a positive electrode layer 110, a negative electrode layer 120, and solid electrolyte 130, are laminated.

The layers constituting the solid-state battery 1 are formed by firing and the solid-state battery 1 includes sintered layers such as the positive electrode layer 110, the negative electrode layer 120, and the solid electrolyte 130. The positive electrode layer 110, the negative electrode layer 120, and the solid electrolyte 130 are preferably integrally fired.

The positive electrode layer 110 is an electrode layer containing at least a positive electrode active material. The positive electrode layer 110 may further contain solid electrolyte. In a favorable aspect, the positive electrode layer 110 is composed of a sintered body that contains at least positive electrode active material particles and solid electrolyte particles. On the other hand, the negative electrode layer 120 is an electrode layer containing at least a negative electrode active material. The negative electrode layer 120 may further contain solid electrolyte. In a favorable aspect, the negative electrode layer 120 is composed of a sintered body that contains at least negative electrode active material particles and solid electrolyte particles.

The positive electrode active material and the negative electrode active material are substances involved in electron transfer in the solid-state battery. The electron transfer is performed in a manner such that ions move (conduct) between the positive electrode layer 110 and the negative electrode layer 120 via the solid electrolyte. Charge/discharge is thus performed. The positive electrode layer 110 and the negative electrode layer 120 are preferably layers that can occlude and release especially lithium ions. That is, the solid-state battery is preferably an all-solid-state secondary battery in which lithium ions move between the positive electrode layer 110 and the negative electrode layer 120 via the solid electrolyte to perform charge/discharge of the battery.

<Positive Electrode Active Material>

The positive electrode active material contained in the positive electrode layer 110 is at least one selected from the group consisting of a lithium-containing phosphoric acid compound having a nasicon-type structure, a lithium-containing phosphoric acid compound having an olivine-type structure, lithium-containing layered oxide, lithium-containing oxide having a spinel-type structure, and the like, for example Examples of the lithium-containing phosphoric acid compound having a nasicon-type structure include $Li_3V_2(PO_4)_3$. Examples of the lithium-containing phosphoric acid compound having an olivine-type structure include $Li_3Fe_2(PO_4)_3$, $LiFePO_4$, and $LiMnPO_4$. Examples of the lithium-containing layered oxide include $LiCoO_2$ and $LiCo_{1/3}Ni_{1/3}Mn_{1/3}O_2$. Examples of the lithium-containing oxide having a spinel-type structure include $LiMn_2O_4$ and $LiNi_{0.5}Mn_{1.5}O_4$.

<Negative Electrode Active Material>

The negative electrode active material contained in the negative electrode layer 120 is at least one selected from the group consisting of oxide containing at least one element selected from the group consisting of Ti, Si, Sn, Cr, Fe, Nb, and Mo, a graphite-lithium compound, a lithium alloy, a lithium-containing phosphoric acid compound having a nasicon-type structure, a lithium-containing phosphoric acid compound having an olivine-type structure, lithium-containing oxide having a spinel-type structure, and the like, for example. Examples of the lithium alloy include Li—Al. Examples of the lithium-containing phosphoric acid compound having a nasicon-type structure include $Li_3V_2(PO_4)_3$ and $LiTi_2(PO_4)_3$. Examples of the lithium-containing phosphoric acid compound having an olivine-type structure include $Li_3Fe_2(PO_4)_3$ and $LiCuPO_4$. Examples of the lithium-containing oxide having a spinel-type structure include $Li_4Ti_5O_{12}$.

One or both of the positive electrode layer 110 and the negative electrode layer 120 may contain a conductive aid. The conductive aid contained in the positive electrode layer 110 and the negative electrode layer 120 can be at least one material that contains: a metal material such as silver, palladium, gold, platinum, aluminum, copper, and nickel; carbon; and the like. Not especially limited, copper is favorable on the point that copper does not easily react with the positive electrode active material, the negative electrode active material, the solid electrolyte material, and the like and is effective in reducing internal resistance of the solid-state battery.

Further, one or both of the positive electrode layer 110 and the negative electrode layer 120 may contain a sintering aid. The sintering aid can be at least one selected from the group consisting of lithium oxide, sodium oxide, potassium oxide, boron oxide, silicon oxide, bismuth oxide, and phosphorus oxide.

<Solid Electrolyte>

The solid electrolyte 130 is a material that can conduct lithium ions. Especially, the solid electrolyte 130 serving as a battery constituting unit in the solid-state battery is a layer that can conduct lithium ions between the positive electrode layer 110 and the negative electrode layer 120. Specific examples of the solid electrolyte 130 include lithium-containing phosphoric acid compound having a nasicon structure, oxide having a perovskite structure, and oxide having a garnet-type or a garnet-type-like structure. Examples of the lithium-containing phosphoric acid compound having a nasicon structure include $Li_xM_y(PO_4)_3$ ($1 \le x \le 2$, $1 \le y \le 2$, M is at least one selected from the group consisting of Ti, Ge, Al, Ga, and Zr). Examples of the lithium-containing phosphoric acid compound having a nasicon structure include $Li_{1.2}Al_{0.2}Ti_{1.8}(PO_4)_3$. Examples of the oxide having a perovskite structure include $La_{0.55}Li_{0.35}TiO_3$. Examples of the oxide having a garnet-type or a garnet-type-like structure include $Li_7La_3Zr_2O_{12}$.

The solid electrolyte 130 may contain a sintering aid. The sintering aid contained in the solid electrolyte 130 may be selected from the same materials as those of sintering aids that can be contained in the positive electrode layer 110 and the negative electrode layer 120, for example.

<Positive Electrode Current Collector Layer and Negative Electrode Current Collector Layer>

The positive electrode layer 110 and the negative electrode layer 120 may respectively include a positive electrode current collector layer and a negative electrode current collector layer. Each of the positive electrode current collector layer and the negative electrode current collector layer may have a foil shape. However, from the viewpoints of reduction in manufacturing cost of a solid-state battery through integral firing and reduction in internal resistance of the solid-state battery, the positive electrode current collector layer and the negative electrode current collector layer may have a shape of a sintered body. When the positive electrode current collector layer and the negative electrode current collector layer have the shape of a sintered body, the positive electrode current collector layer and the negative electrode current collector layer may be composed of a sintered body containing a conductive aid and a sintering aid. The conductive aid contained in the positive electrode current collector layer and the negative electrode current collector layer may be selected from the same materials as those of conductive aids that can be contained in the positive electrode layer 110 and the negative electrode layer 120, for example. The sintering aid contained in the positive electrode current collector layer and the negative electrode current collector layer may be selected from the same materials as those of sintering aids that can be contained in the positive electrode layer 110 and the negative electrode layer 120, for example. Here, the positive electrode current collector layer and the negative electrode current collector layer are not essential components for the solid-state battery.

<End Surface Electrode>

The solid-state battery 1 is provided with an end surface electrode serving as the positive electrode 1P and an end surface electrode serving as the negative electrode 1N. These end surface electrodes preferably contain a material with high conductivity. Not especially limited, a specific material of the end surface electrode can be at least one selected from the group consisting of silver, gold, platinum, aluminum, copper, tin, and nickel.

Figure 3:
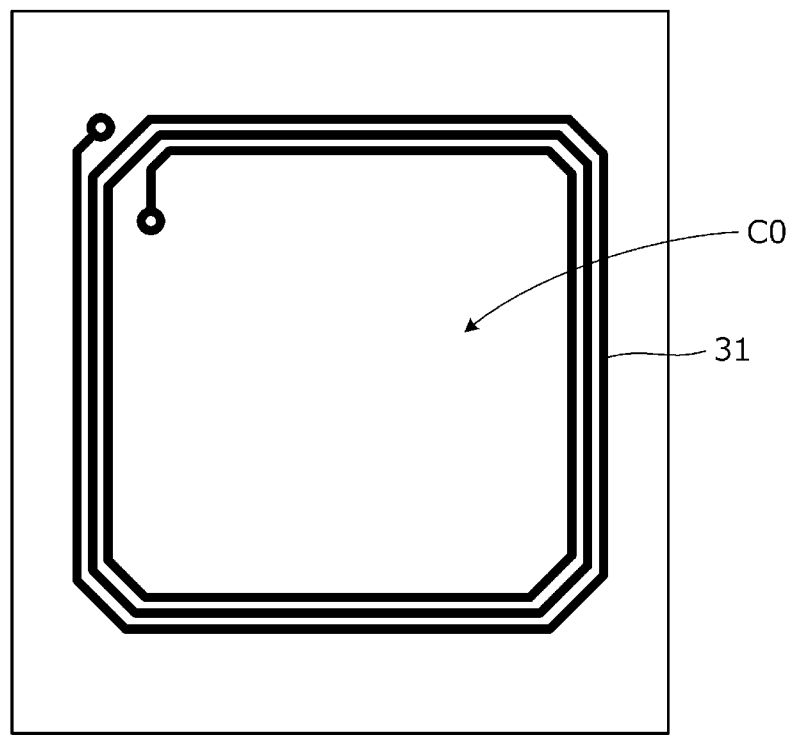
FIG. 3 is a plan view illustrating a configuration of a power receiving coil.

FIG. 3 is a plan view illustrating a configuration of the power receiving coil 31. FIG. 3 illustrates only the power receiving coil 31 in particular. The power receiving coil 31 is wound multiple times to have a square spiral shape, and a coil opening CO is formed on the center. A coil having a spiral shape is also formed on the power transmission device, and this coil and the power receiving coil 31 are mutually coupled via a magnetic field.

Figure 4:
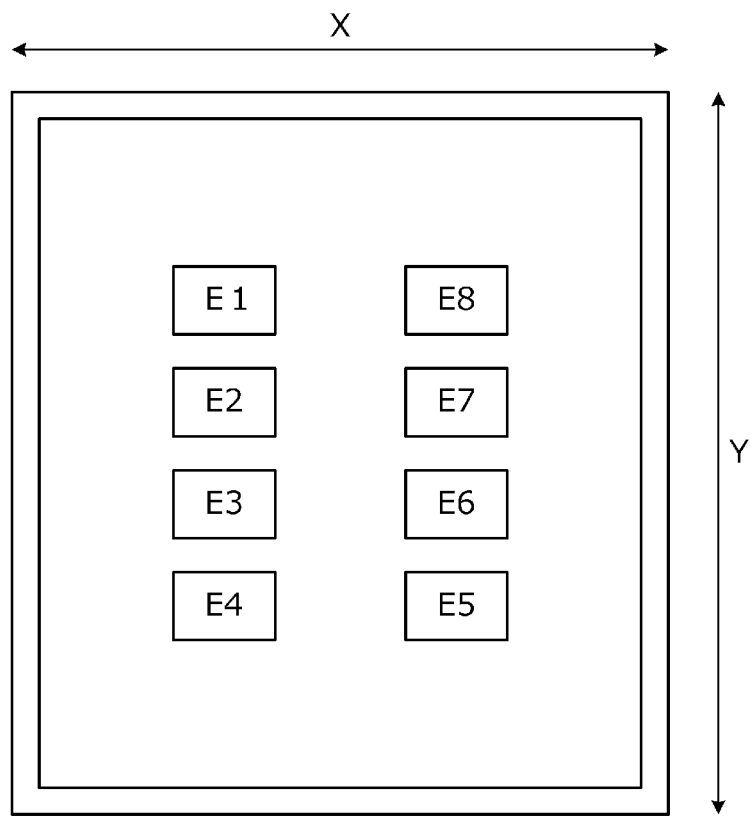
FIG. 4 is a bottom view of the wireless rechargeable solid-state battery module.

FIG. 4 is a bottom view of the wireless rechargeable solid-state battery module 101. In this example, eight terminals E1 to E8 are provided. The plane dimensions of the wireless rechargeable solid-state battery module 101 are X=10 mm and Y=11 mm, and a dimension of each of the terminals E1 to E8 is 1.8 mm×1.2 mm.

A name, a function, and a role of each terminal are shown below.

E1: VBAT+ battery voltage output terminal (2.0 V to 4.35 V)
E2: CSO charging state monitoring terminal
E3: VOUT positive electrode terminal (1.8 V or 3.0 V or 3.3 V)
E4: CE regulator Enable input terminal
E5: GND negative electrode terminal
E6: ISET charging current control input terminal
E7: THIN temperature monitoring NTC thermistor input terminal
E8: VIN voltage input terminal Here, the battery voltage output terminal E1 is a positive electrode output terminal of the solid-state battery 1. The charging state monitoring terminal E2 outputs a signal indicating a charging state of the solid-state battery 1. The positive electrode terminal E3 is an output terminal of an output voltage stabilization circuit. The regulator Enable input terminal E4 is a switching signal terminal for enabling/disabling an operation of the output voltage stabilization circuit. The negative electrode terminal E5 is a terminal of a ground potential. The charging current control input terminal E6 is an input terminal for controlling charging current. The temperature monitoring NTC thermistor input terminal E7 is a terminal that is used for connecting a negative characteristics (NTC) thermistor so as to detect an overheated state and perform corresponding processing. The voltage input terminal E8 is a terminal that is used for inputting, for example, 5 V as a power supply voltage from the outside when wireless charging is not performed, and the voltage input terminal E8 corresponds to a "voltage input terminal" according to the present disclosure.

Here, the terminals E4, E6, and E7 can be configured to be unexposed to the outside.

FIG. 5 is a circuit diagram of the wireless rechargeable solid-state battery module 101. This wireless rechargeable solid-state battery module 101 includes a wireless charging circuit 50. The wireless charging circuit 50 includes the power receiving coil 31, the rectifier circuit 52, the DC-DC converter 54, and a charge control circuit 55. The power receiving coil 31 receives a power transmission magnetic field. The rectifier circuit 52 rectifies induced current of the power receiving coil 31. The DC-DC converter 54 converts an output voltage of the rectifier circuit 52 so as to generate a charging voltage. The charge control circuit 55 inputs an output voltage of the DC-DC converter 54 so as to perform charging control of the solid-state battery 1. Here, the DC-DC converter 54 corresponds to a "voltage conversion circuit" of the present disclosure. The power receiving coil 31 is expressed with an inductor 31L and an equivalent resistance 31R. A resonant capacitor 51 is connected to the power receiving coil 31. The resonant capacitor 51 constitutes a resonant circuit LC1 together with the power receiving coil 31. A capacitor 531 is connected to an output of the rectifier circuit 52. A capacitor 532 is connected to an output of the DC-DC converter 54. Further, a protection circuit 56 is provided between the charge control circuit 55 and the solid-state battery 1. A voltage regulator 57 is further provided between a connection point of the charge control circuit 55 and the protection circuit 56 and the positive electrode terminal E3 and between the connection point and the negative electrode terminal E5. The voltage regulator 57 is, for example, a low dropout regulator (LDO) and is a linear regulator composed of a MOS-FET and an operational amplifier. The voltage regulator 57 stabilizes a voltage of the solid-state battery 1 and outputs the stabilized voltage to the positive electrode terminal E3 and the negative electrode terminal E5. Here, the voltage regulator 57 corresponds to an "output voltage stabilization circuit" of the present disclosure.

The power receiving coil 31 and the rectifier circuit 52 are configured on the second circuit board 30 illustrated in FIG. 1. Other circuits are configured on the first circuit board 20.

The resonant circuit LC1 resonates in a frequency band of a magnetic field received from the power transmission device, such as frequency bands of 6.78 MHz and 13.56 MHz. These frequency bands are industrial scientific and medical (ISM) bands, and are favorable in a design with electromagnetic compatibility (EMC). The power receiving coil 31 outputs received power to the rectifier circuit 52. The rectifier circuit 52 rectifies the received AC voltage to direct current. The capacitor 531 smooths an output voltage of the rectifier circuit 52 and outputs the voltage to the DC-DC converter 54. The DC-DC converter 54 converts the voltage and outputs the converted voltage to the charge control circuit 55. The capacitor 532 smooths the output voltage of the DC-DC converter 54. The charge control circuit 55 charges the solid-state battery 1 with the received DC voltage that is obtained through the rectification from alternate current and through the voltage conversion. The voltage regulator 57 converts an output voltage of the solid-state battery 1 and outputs the converted voltage to the positive electrode terminal E3 and the negative electrode terminal E5.

The protection circuit 56 performs overcurrent protection in charging/discharging of the solid-state battery 1 and performs protection for overvoltage input to the solid-state battery 1. Further, the protection circuit 56 performs overheat protection depending on a resistance value of an NTC thermistor connected to the terminal E7. For example, when charging/discharging current to the solid-state battery 1 exceeds a specified value, the protection circuit 56 limits the current. Also, when a voltage of the solid-state battery 1 exceeds a predetermined value, the protection circuit 56 limits the charging current. Further, when the temperature or an ambient temperature of the solid-state battery 1 is out of a range of a predetermined value, the protection circuit 56 suppresses the charging or discharging.

In the example illustrated in FIG. 5, the voltage input terminal E8 for inputting a voltage is connected to an input unit of the DC-DC converter 54. In a state in which power reception is not performed with the power receiving coil 31, the wireless rechargeable solid-state battery module 101 is operated by inputting a certain value or larger voltage (for example, 5 V) from the voltage input terminal E8. The voltage input terminal E8 may be connected to the input unit of the rectifier circuit 52.

The battery voltage output terminal E1 is connected to the positive electrode of the solid-state battery 1 via the protection circuit 56. The voltage of the solid-state battery 1 can be detected via the battery voltage output terminal E1.

The charge control circuit 55 includes a monitor signal output unit 55M that outputs a signal which indicates a charging control state with respect to the solid-state battery 1. The charging state monitoring terminal E2 is connected to the monitor signal output unit 55M. The charging control state of the solid-state battery 1 can be detected via the charging state monitoring terminal E2.

Figure 6:
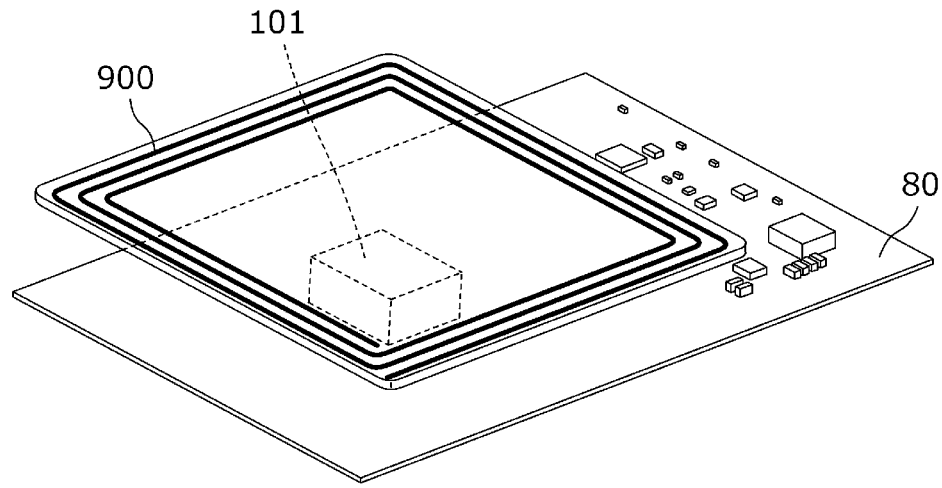
FIG. 6 is a perspective view illustrating an example of a state in which the wireless rechargeable solid-state battery module is mounted on a mounting board and a positional relation with respect to a power transmission coil of a power transmission device.

FIG. 6 is a perspective view illustrating an example of a state in which the wireless rechargeable solid-state battery module 101 of the present embodiment is mounted on the mounting board 80 and a positional relation with respect to a power transmission coil 900 of a power transmission device. The mounting board 80 on which the wireless rechargeable solid-state battery module 101 is mounted is housed in a casing of an electronic device, in practice. In a similar manner, the power transmission coil 900 is housed in a casing of the power transmission device. The coil opening of the power receiving coil (the power receiving coil 31 illustrated in FIGS. 1 and 3) of the wireless rechargeable solid-state battery module 101 and a coil opening of the power transmission coil 900 are overlapped with each other in plan view. The power receiving coil 31 and the power transmission coil 900 are mutually coupled via a magnetic field in a state in which the power receiving coil 31 and the power transmission coil 900 are brought mutually closer within a prescribed distance, and power transmission/reception is performed via the magnetic field. In a similar manner, the illustration is omitted, but the power receiving coil 31 and the power transmission coil 900 can be exchanged for respective electrodes and mutually coupled via an electric field in a state in which the electrodes are brought mutually closer within a prescribed distance.

Figure 7:
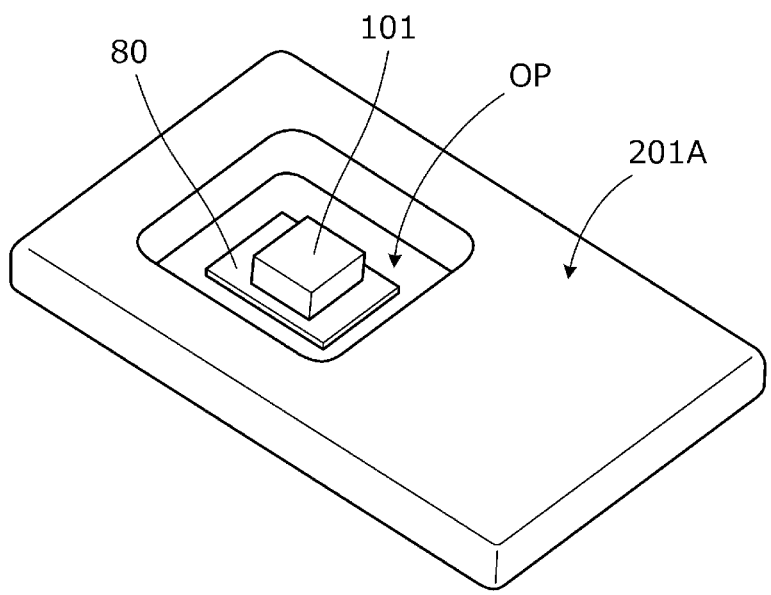
FIG. 7 is a perspective view illustrating another example of a state in which the wireless rechargeable solid-state battery module is mounted on the mounting board and a positional relation with respect to a power transmission device.

FIG. 7 is a perspective view illustrating another example of a state in which the wireless rechargeable solid-state battery module 101 of the present embodiment is mounted on the mounting board 80 and a positional relation with respect to a power transmission device 201A. In this example, the power transmission device 201A has an opening OP and a power transmission coil is formed in a manner to be wound around the opening OP. When the opening OP of the power transmission device 201A is put over the wireless rechargeable solid-state battery module 101, the coil opening of the power receiving coil and the coil opening of the power transmission coil are mutually overlapped in plan view. Power transmission/reception is performed via the magnetic field. In a similar manner, the illustration is omitted, but the power receiving coil and the power transmission coil can be exchanged for respective electrodes and power transmission/reception can be performed via an electric field.

Figure 8:
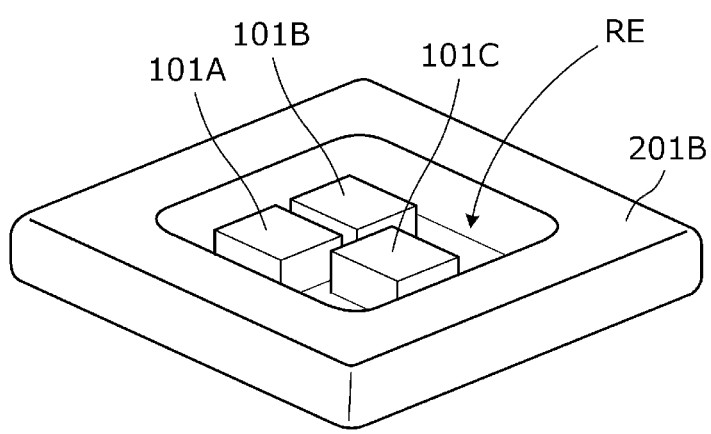
FIG. 8 is a perspective view illustrating a state in which a power transmission device transmits power to a plurality of wireless rechargeable solid-state battery modules.

FIG. 8 is a perspective view illustrating a state in which a power transmission device 201B transmits power to a plurality of wireless rechargeable solid-state battery modules 101A, 101B, and 101C. In this example, the power transmission device 201B has a concave portion RE and a power transmission coil is formed in a manner to be wound around the concave portion RE. When the plurality of wireless rechargeable solid-state battery modules 101, each of which is a single body, are put in the concave portion RE of the power transmission device 201B, the coil opening of the power receiving coil in each of the wireless rechargeable solid-state battery modules and the coil opening of the power transmission coil are mutually overlapped in plan view. Power transmission/reception is performed via the magnetic field. In a similar manner, the illustration is omitted, but the power receiving coil and the power transmission coil can be exchanged for respective electrodes and power transmission/reception can be performed via an electric field.

Figure 9:
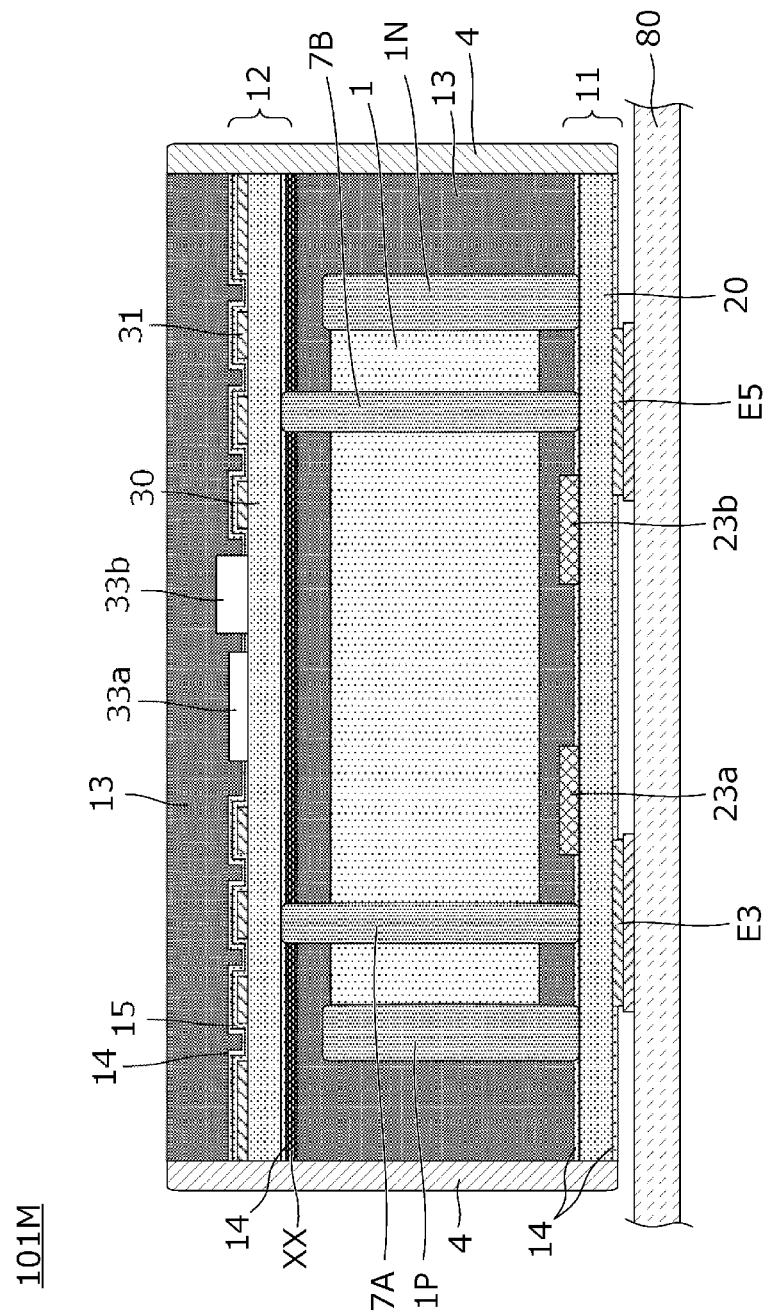
FIG. 9 is a sectional view of another wireless rechargeable solid-state battery module according to the first embodiment.

FIG. 9 is a sectional view of another wireless rechargeable solid-state battery module 101M according to the first embodiment. The wireless rechargeable solid-state battery module 101M includes the solid-state battery 1, the internal structures 11 and 12, the barrier layers 14, the buffer layer 15, the mold resin portion 13, the positive electrode terminal E3, and the negative electrode terminal E5. The mold resin portion 13 is provided on the upper portion from the internal structure 12.

The electronic components 33a and 33b and the like such as a DC-DC converter IC and a capacitor are mounted on the outer surface (the opposite surface to the surface facing the solid-state battery 1) of the second circuit board 30.

Other configurations are the same as those of the wireless rechargeable solid-state battery module 101 illustrated in FIG. 1. In the wireless rechargeable solid-state battery module 101M illustrated in FIG. 9, the mold resin portion 13 is provided on the outer surface of the second circuit board 30 constituting the internal structure 12, being able to mount electronic components on the outer surface of the second circuit board 30. Thus, both surfaces of the second circuit board 30 can be more efficiently utilized.

Features of the wireless rechargeable solid-state battery modules 101 and 101M described above will be listed as follows.

(1) A portion constituting a circuit (peripheral circuit) connected to the solid-state battery 1 is overlapped with the solid-state battery 1 in plan view, being able to provide a wireless rechargeable solid-state battery module that has substantially the same area as that of the solid-state battery 1 but is provided with the peripheral circuit.

(2) The incorporation of a peripheral circuit corresponding to characteristics of the solid-state battery 1 eliminates a necessity of designing based on characteristics of individual solid-state batteries on the user side, improving convenience.

(3) The second circuit board 30 is a flexible resin board having water resistance. Accordingly, the flexible resin board releases stress caused by expansion and contraction of the solid-state battery 1 while maintaining the water resistance, enhancing reliability of a charging/discharging cycle.

(4) The positive electrode terminal and the negative electrode terminal are arranged on a lower surface, having a large area, of a package having a rectangular parallelepiped shape, enabling surface mounting on a mounting board by a reflow soldering method.

(5) Wireless power transmission is performed, eliminating a need for a charging terminal and being able to simplify designing on water resistance of an electronic device on which the wireless rechargeable solid-state battery module is mounted.

Second Embodiment

A second embodiment will describe a wireless rechargeable solid-state battery module having a different circuit configuration from that in the example described in the first embodiment.

Figure 10:
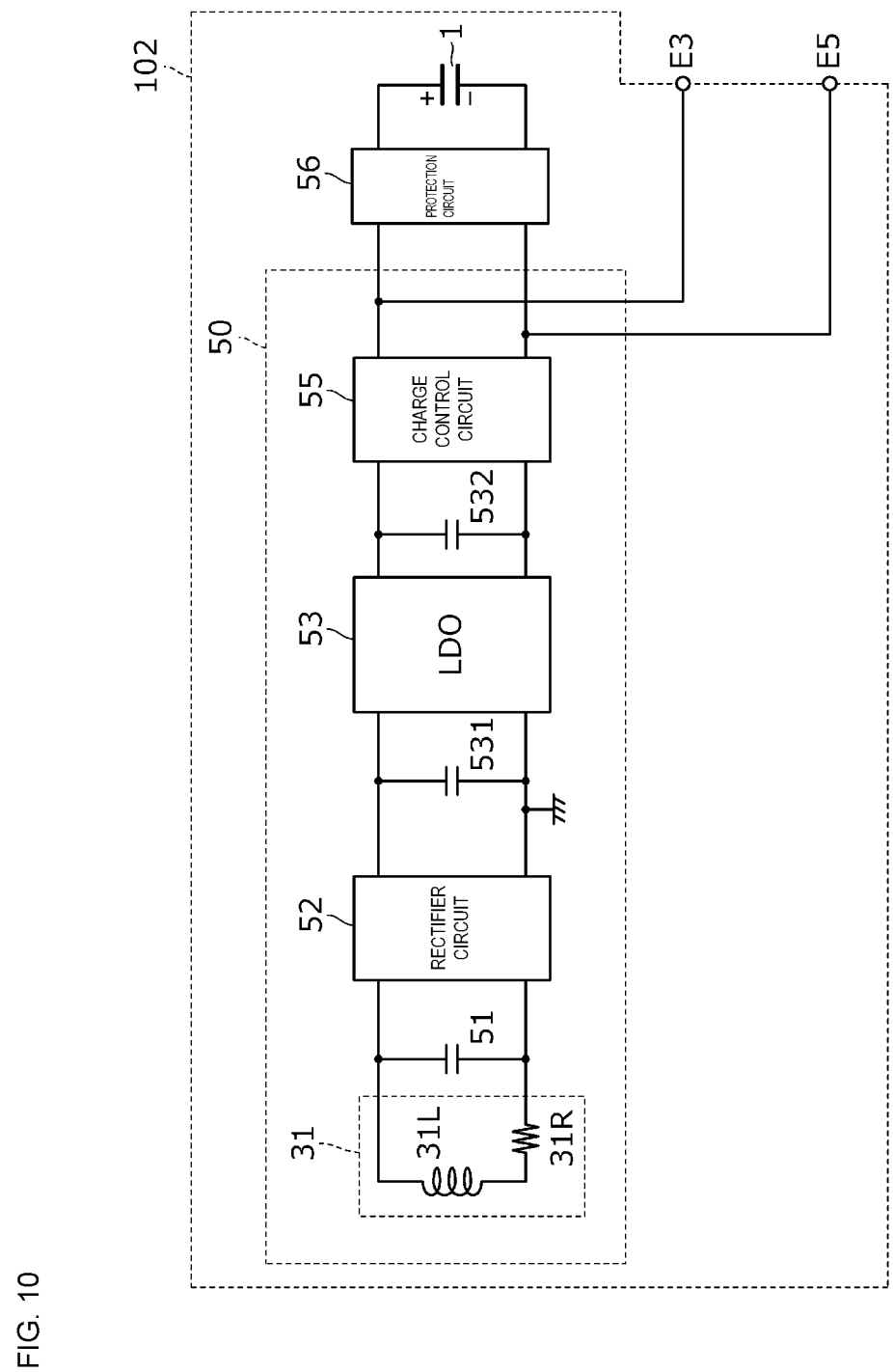
FIG. 10 is a circuit diagram of a wireless rechargeable solid-state battery module according to a second embodiment.

FIG. 10 is a circuit diagram of a wireless rechargeable solid-state battery module 102 according to the second embodiment. The wireless rechargeable solid-state battery module 102 includes the power receiving coil 31, the rectifier circuit 52, a voltage regulator 53, the charge control circuit 55, and the solid-state battery 1.

The voltage regulator 53 is, for example, a low dropout regulator (LDO) and is a linear regulator composed of a MOS-FET and an operational amplifier. The voltage regulator 53 stabilizes an output voltage of the rectifier circuit 52. The circuit configuration other than the voltage regulator 53 is the same as that in the example illustrated in FIG. 5. However, the example illustrated in FIG. 10 does not include the voltage regulator 57.

Thus, a rectified voltage may be stabilized with a linear regulator. This configuration achieves voltage regulation in a lower range of voltage induced by the power receiving coil 31.

Third Embodiment

A third embodiment will describe a wireless rechargeable solid-state battery module having a different circuit configuration from that in the example described in the first embodiment. A circuit configuration of a power transmission device will be also described.

Figure 11:
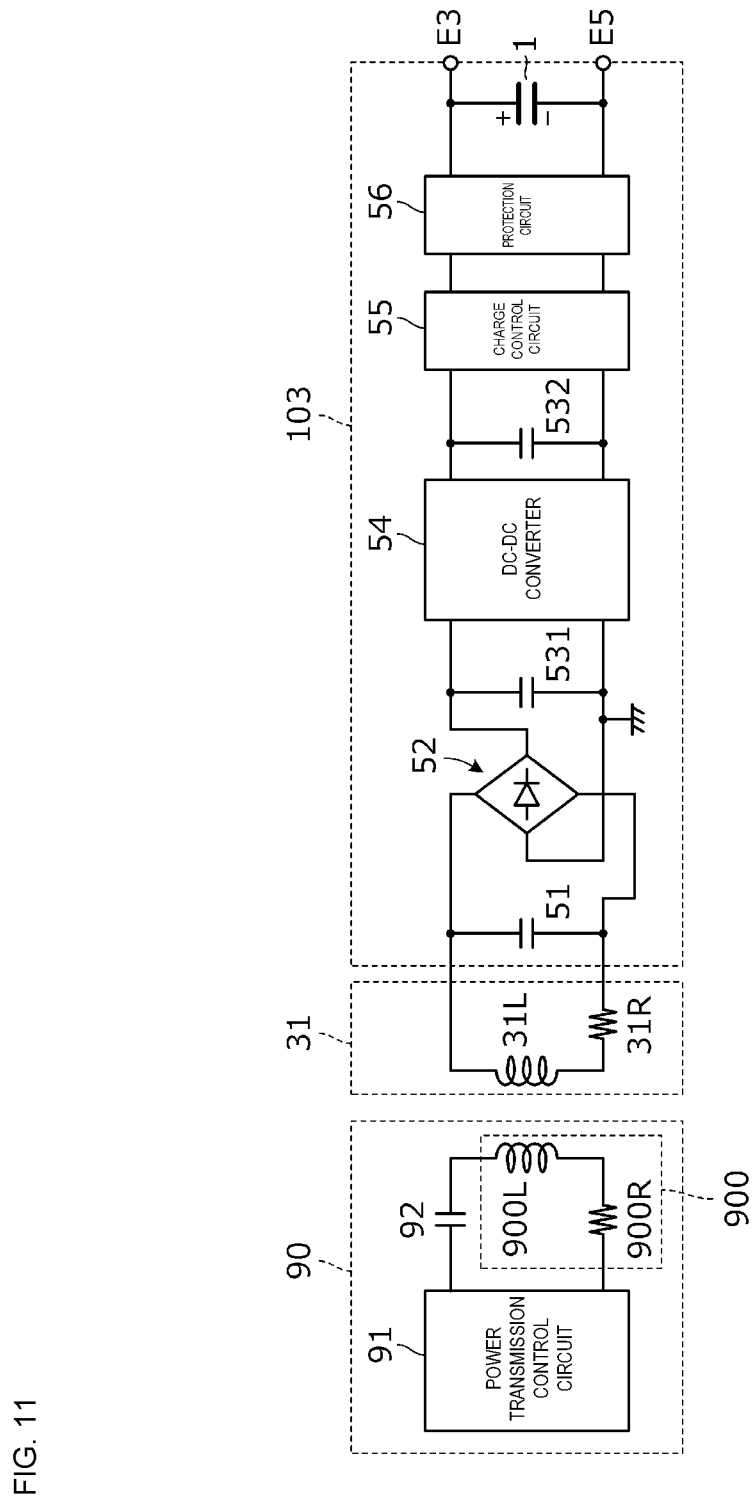
FIG. 11 is a circuit diagram of a wireless rechargeable solid-state battery module according to a third embodiment.

FIG. 11 is a circuit diagram of a wireless rechargeable solid-state battery module 103 according to the third embodiment. This wireless rechargeable solid-state battery module 103 includes the power receiving coil 31, the rectifier circuit 52, the DC-DC converter 54, the charge control circuit 55, the solid-state battery 1, and the protection circuit 56.

In the wireless rechargeable solid-state battery module 103, the voltage regulator 57 is not provided and the positive electrode terminal E3 and the negative electrode terminal E5 are connected to the output unit of the solid-state battery 1. Other configurations are the same as those of the example illustrated in FIG. 5. However, FIG. 11 shows the rectifier circuit 52 with a diode bridge circuit.

A power transmission device 90 includes a power transmission control circuit 91, the power transmission coil 900, and a resonant capacitor 92. The power transmission coil 900 is expressed with an inductor 900L and an equivalent resistance 900R. The power transmission coil 900 and the resonant capacitor 92 constitute a resonant circuit that resonates in a power transmission frequency band. The resonant circuit resonates in frequency bands of 6.78 MHz and 13.56 MHz, for example. These frequency bands are industrial scientific and medical (ISM) bands, and are favorable in a design with electromagnetic compatibility (EMC). The resonance circuit on the power transmission device side and the resonant circuit composed of the power receiving coil 31 and the resonant capacitor 51 on the wireless rechargeable solid-state battery module side are mutually coupled to produce magnetic field resonance.

The power transmission control circuit 91 of the power transmission device 90 interrupts direct current traveling to the power transmission coil 900 so as to generate an alternating magnetic field from the power transmission coil 900. Thus, power is transmitted from the power transmission device 90 to the wireless rechargeable solid-state battery module 103 with the use of a DC resonant technique.

The wireless rechargeable solid-state battery module 103 outputs 3.7 V, for example, as a discharging voltage of the solid-state battery 1.

According to the present embodiment, power is transmitted from the power transmission device to the wireless rechargeable solid-state battery module by using the DC resonant technique and therefore, highly efficient charging can be achieved. This configuration enhances flexibility in the positional relation between the power transmission device and the wireless rechargeable solid-state battery module.

Fourth Embodiment

A fourth embodiment will describe a wireless rechargeable solid-state battery module that transmits a communication signal to a power transmission device.

Figure 12:
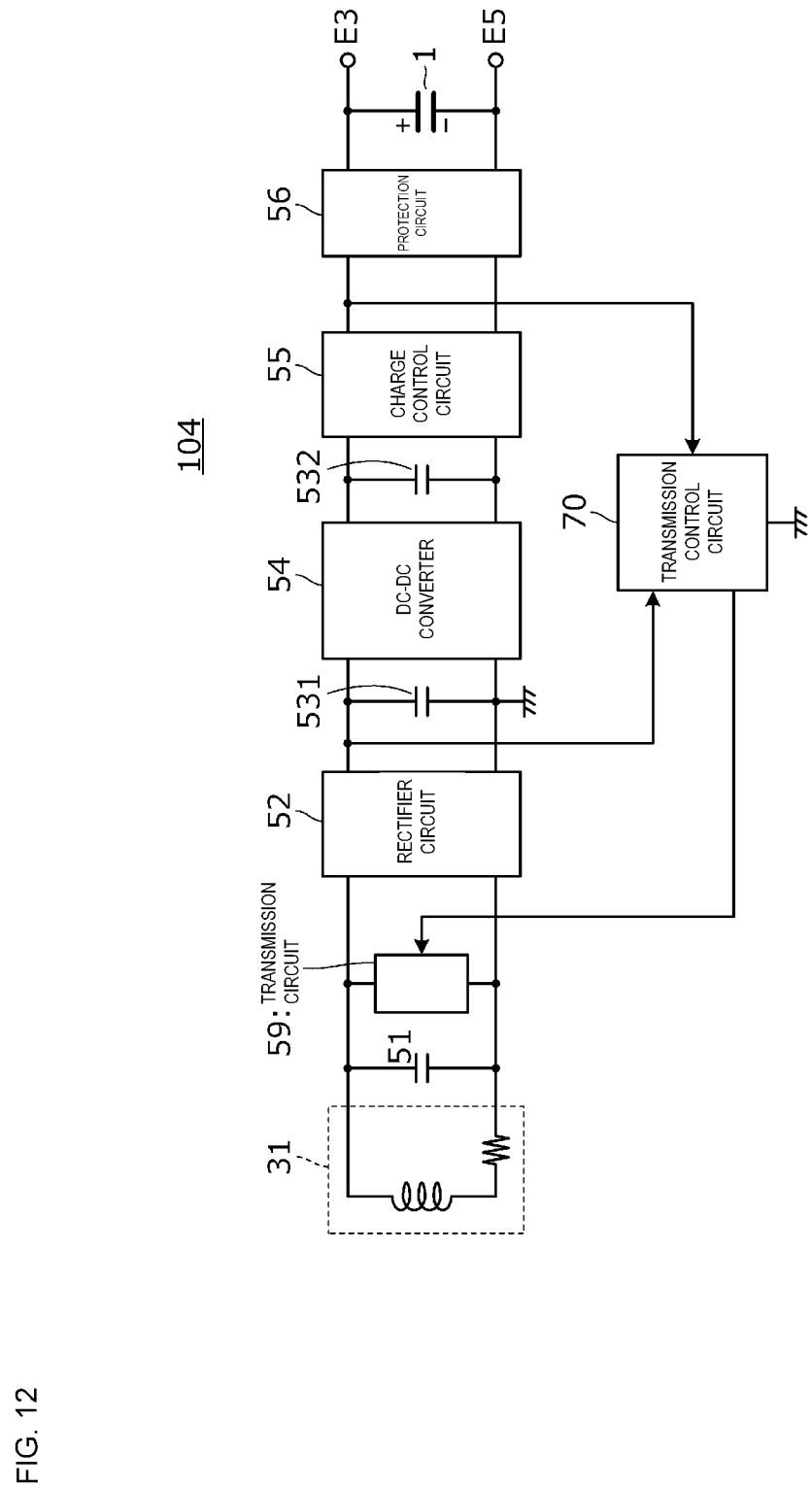
FIG. 12 is a circuit diagram of a wireless rechargeable solid-state battery module according to a fourth embodiment.

FIG. 12 is a circuit diagram of a wireless rechargeable solid-state battery module 104 according to the fourth embodiment. This wireless rechargeable solid-state battery module 104 includes the power receiving coil 31, the rectifier circuit 52, the DC-DC converter 54, the charge control circuit 55, the solid-state battery 1, the protection circuit 56, a transmission control circuit 70, and a transmission circuit 59.

The transmission circuit 59 transmits a communication signal in response to change of power consumption of a circuit connected with the power receiving coil 31. That is, binary amplitude-shift keying (ASK) is performed in a manner such that a load on the power receiving side is changed by backscatter modulation similar to a passive RFID tag. Alternatively, the transmission circuit 59 changes a resonance condition of the resonant circuit composed of the power receiving coil 31 and the resonant capacitor 51 so as to transmit a signal through this change. For example, the resonant capacitor 51 and the transmission circuit 59 change an equivalent resonant capacitance so as to change a resonant frequency of the resonant circuit. This changes an impedance of the resonant circuit based on the power transmission device with respect to the power receiving side and the power transmission device accordingly receives a communication signal. The transmission circuit 59 corresponds to a "signal transmission circuit" according to the present disclosure.

The transmission control circuit 70 inputs an output voltage of the rectifier circuit 52, a voltage of the solid-state battery 1, and the like and produces transmission data based on these values. The transmission data include difference of a received power amount with respect to a required amount, a power transmission stop request, power being received, and a charging rate to the solid-state battery 1, for example.

Fifth Embodiment

A fifth embodiment will describe a wireless rechargeable solid-state battery module including a power reception protection circuit that stops power reception when a received voltage exceeds a prescribed voltage range.

Figure 13:
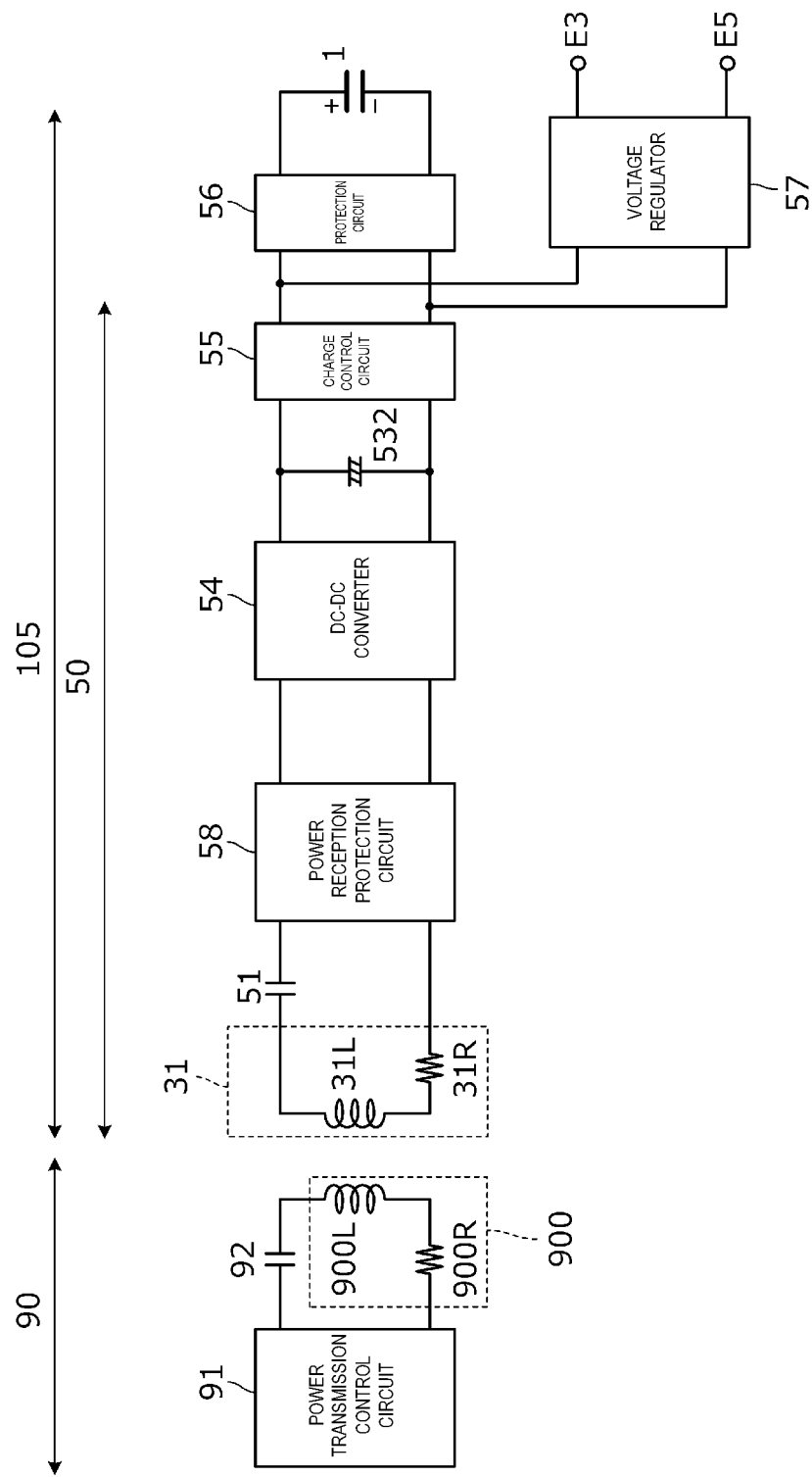
FIG. 13 is a circuit diagram of a wireless rechargeable solid-state battery module and the like according to a fifth embodiment.

FIG. 13 is a circuit diagram of a wireless rechargeable solid-state battery module 105 and the like. FIG. 13 also illustrates a circuit of the power transmission device 90.

This wireless rechargeable solid-state battery module 105 includes the solid-state battery 1 and the wireless charging circuit 50 that is connected to the solid-state battery 1. The wireless charging circuit 50 includes the power receiving coil 31, a power reception protection circuit 58, the DC-DC converter 54, the charge control circuit 55, the protection circuit 56, and the voltage regulator 57. The power receiving coil 31 receives a power transmission magnetic field or a power transmission electromagnetic field. The DC-DC converter 54 converts an output voltage of a rectifying and smoothing circuit included in the power reception protection circuit 58 so as to generate a charging voltage. The charge control circuit 55 inputs an output voltage of the DC-DC converter 54 so as to perform charging control of the solid-state battery 1. The protection circuit 56 protects the solid-state battery 1. The voltage regulator 57 converts current of the solid-state battery 1 into an output voltage for a general-purpose battery. The power reception protection circuit 58 rectifies induced current of the power receiving coil 31, and stops power reception of the DC-DC converter 54 when a received voltage exceeds a prescribed voltage range.

The power receiving coil 31 is expressed with the inductor 31L and the equivalent resistance 31R. The resonant capacitor 51 is connected to the power receiving coil 31. The resonant capacitor 51 constitutes a resonant circuit together with the power receiving coil 31. The rectifier circuit 52 includes a smoothing capacitor C3. The capacitor 532 is connected to the output of the DC-DC converter 54. The voltage regulator 57 is, for example, a low dropout regulator (LDO) and is a linear regulator composed of a MOS-FET and an operational amplifier. The voltage regulator 57 stabilizes a voltage of the solid-state battery 1 and outputs the stabilized voltage to the positive electrode terminal E3 and the negative electrode terminal E5.

The power transmission device 90 includes the power transmission control circuit 91, the power transmission coil 900, and the resonant capacitor 92. The power transmission coil 900 is expressed with the inductor 900L and the equivalent resistance 900R. The power transmission coil 900 and the resonant capacitor 92 constitute a resonant circuit that resonates in a power transmission frequency band. The resonant circuit resonates in frequency bands of 6.78 MHz and 13.56 MHz, for example. These frequency bands are industrial scientific and medical (ISM) bands, and are favorable in a design with electromagnetic compatibility (EMC). The resonance circuit on the power transmission device side and the resonant circuit composed of the power receiving coil 31 and the resonant capacitor 51 on the wireless rechargeable solid-state battery module 105 side are mutually coupled to produce magnetic field resonance.

The resonant circuit composed of the power receiving coil 31 and the resonant capacitor 51 resonates in a frequency band of an electromagnetic field or a magnetic field received from the power transmission device 90, such as frequency bands of 6.78 MHz and 13.56 MHz. The power receiving coil 31 outputs received power to the power reception protection circuit 58. The power reception protection circuit 58 rectifies a received AC voltage into direct current, and stops power reception of the DC-DC converter 54 when a received voltage exceeds a prescribed voltage range. The DC-DC converter 54 converts a voltage and outputs the converted voltage to the charge control circuit 55. The capacitor 532 smooths the output voltage of the DC-DC converter 54. The charge control circuit 55 charges the solid-state battery 1 with the received DC voltage that is obtained through the rectification from alternate current and through the voltage conversion. The voltage regulator 57 converts an output voltage of the solid-state battery 1 and outputs the converted voltage to the positive electrode terminal E3 and the negative electrode terminal E5.

The protection circuit 56 performs overcurrent protection in charging/discharging of the solid-state battery 1 and performs protection for overvoltage input to the solid-state battery 1. Further, the protection circuit 56 performs overheat protection depending on a resistance value of a NTC thermistor. For example, when charging/discharging current to the solid-state battery 1 exceeds a specified value, the protection circuit 56 limits the current. Also, when a voltage of the solid-state battery 1 exceeds a predetermined value, the protection circuit 56 limits the charging current. Further, when the temperature or an ambient temperature of the solid-state battery 1 is out of a range of a predetermined value, the protection circuit 56 suppresses the charging or discharging.

FIGS. 14A, 14B, 14C, and 14D are circuit diagrams illustrating specific examples of the power reception protection circuit 58.

Figure 14A:
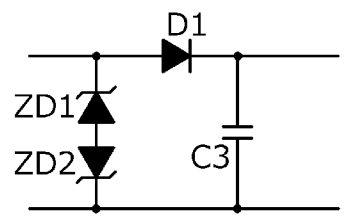
FIGS. 14A, 14B, 14C, and 14D are circuit diagrams illustrating specific examples of a power reception protection circuit.

In the example illustrated in FIG. 14A, a rectifying and smoothing circuit is composed of a diode D1 and a capacitor C3. When a received voltage exceeds Zener voltages of Zener diodes ZD1 and ZD2, both ends of a connection circuit of the Zener diodes ZD1 and ZD2 are brought into conduction and the received voltage is limited to the Zener voltage.

Figure 14B:
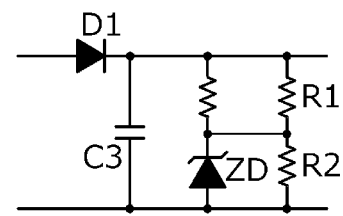

In the example illustrated in FIG. 14B, a rectifying and smoothing circuit is composed of a diode D1 and a capacitor C3. When a divided voltage of resistances R1 and R2 exceeds a Zener voltage of a Zener diode ZD, the Zener diode ZD is brought into conduction and a received voltage is limited by a series circuit composed of the Zener diode and a resistance.

Figure 14C:
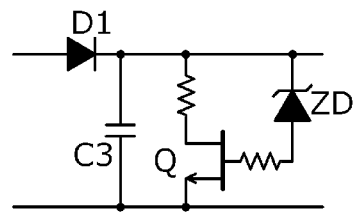

In the example illustrated in FIG. 14C, a rectifying and smoothing circuit is composed of a diode D1 and a capacitor C3. When a rectified and smoothed voltage exceeds a Zener voltage of a Zener diode ZD, a FET Q is brought into conduction and a received voltage is limited by a series circuit composed of the FET Q and resistances.

Figure 14D:
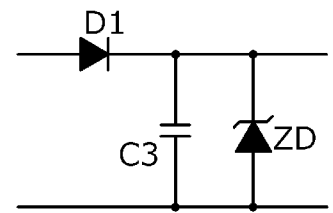

In the example illustrated in FIG. 14D, a rectifying and smoothing circuit is composed of a diode D1 and a capacitor C3. When a rectified and smoothed voltage exceeds a Zener voltage of a Zener diode ZD, the Zener diode ZD is brought into conduction and a received voltage is limited to the Zener voltage.

Thus, when a received voltage exceeds a prescribed voltage range, the power reception protection circuit 58 protects the DC-DC converter 54.

Figure 15:
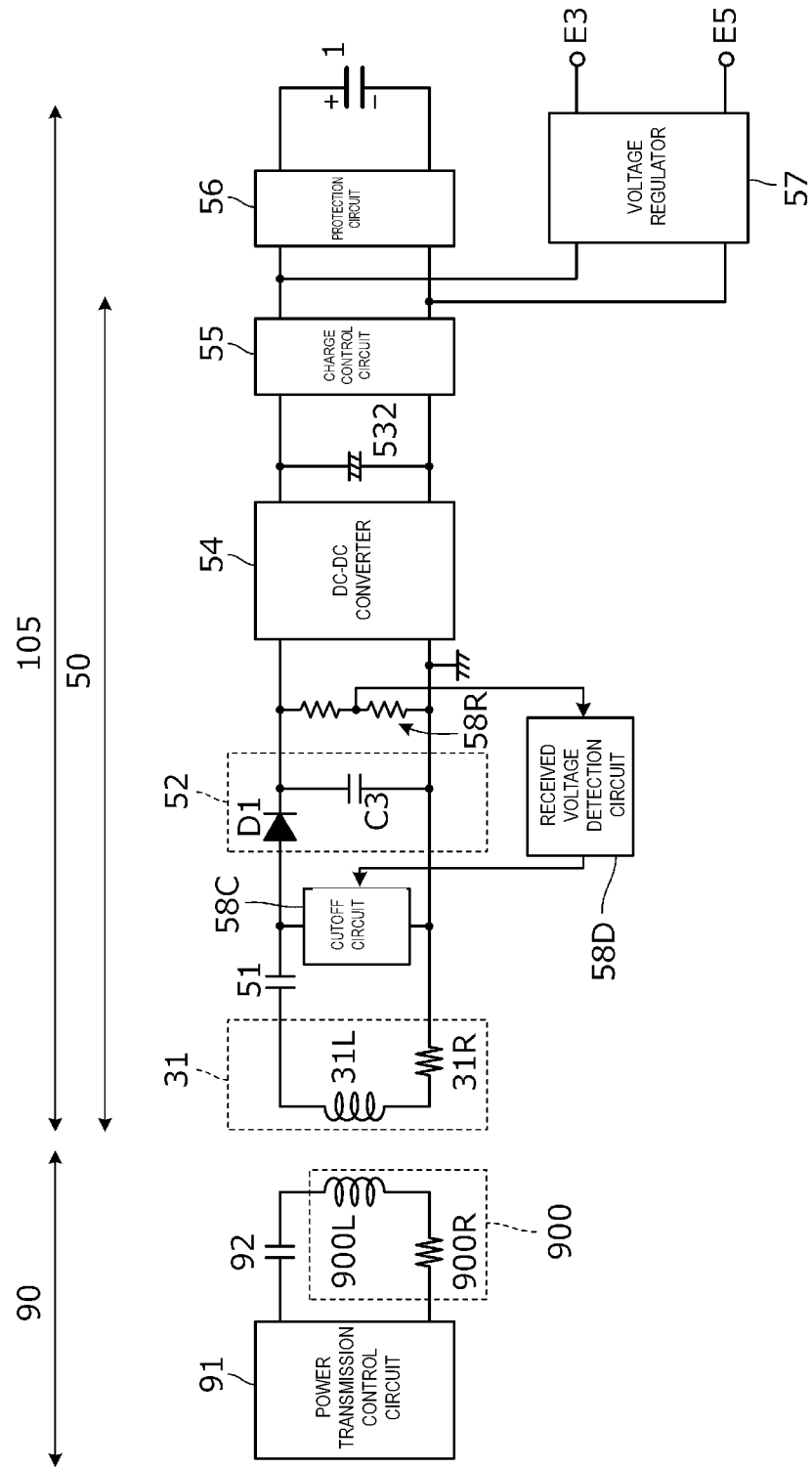

FIG. 15 is another circuit diagram of the wireless rechargeable solid-state battery module 105 and the like according to the fifth embodiment. The wireless rechargeable solid-state battery module 105 includes the solid-state battery 1 and the wireless charging circuit 50 that is connected to the solid-state battery 1. The wireless charging circuit 50 includes the power receiving coil 31, the rectifier circuit 52, a cutoff circuit 58C, a resistance voltage dividing circuit 58R, a received voltage detection circuit 58D, the DC-DC converter 54, and the charge control circuit 55. The power receiving coil 31 receives a power transmission magnetic field. The rectifier circuit 52 rectifies induced current of the power receiving coil 31. The cutoff circuit 58C stops power reception of the rectifier circuit 52 when a received voltage exceeds a prescribed voltage range. The DC-DC converter 54 converts an output voltage of the rectifier circuit 52 so as to generate a charging voltage. The charge control circuit 55 inputs an output voltage of the DC-DC converter 54 so as to perform charging control of the solid-state battery 1. The wireless rechargeable solid-state battery module 105 further includes the protection circuit 56 and the voltage regulator 57. The protection circuit 56 protects the solid-state battery 1. The voltage regulator 57 converts current of the solid-state battery 1 into an output voltage for a general-purpose battery. The power reception protection circuit 58 is composed of the cutoff circuit 58C, the received voltage detection circuit 58D, and the resistance voltage dividing circuit 58R.

When the received voltage detection circuit 58D detects that an output voltage of the resistance voltage dividing circuit 58R exceeds a prescribed value, the received voltage detection circuit 58D outputs a detection signal to the cutoff circuit 58C. When the cutoff circuit 58C receives the detection signal from the received voltage detection circuit 58D, the cutoff circuit 58C stops power reception of the rectifier circuit 52.

Figure 16A:
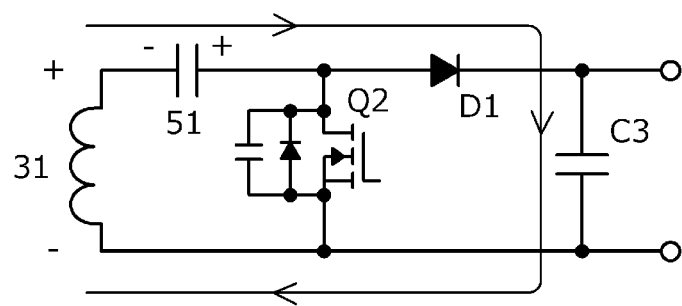
FIGS. 16A and 16B are diagrams for explaining an operation of a cutoff circuit in normal power-reception time.
Figure 16B:
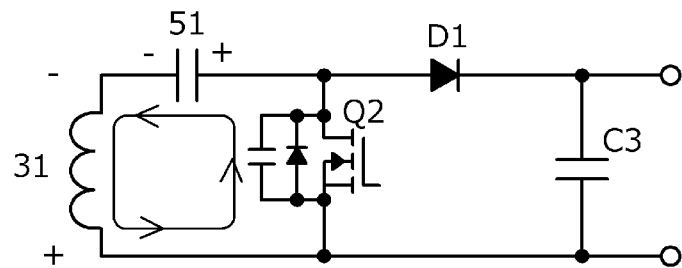

FIGS. 16A and 16B are diagrams for explaining an operation of the cutoff circuit 58C in normal power-reception time. In the normal power-reception time, a FET Q2 of the cutoff circuit 58C is in an off state.

When the first end of the power receiving coil 31 on the capacitor 51 side becomes positive as illustrated in FIG. 16A, current flows in a path along the capacitor 51, the diode D1, and the capacitor C3 from the power receiving coil 31. In this case, a voltage obtained by adding a voltage, charged to the capacitor 51, to a voltage induced by the power receiving coil 31 is charged to the capacitor C3. That is, this voltage is supplied to the rectifier circuit 52.

When the second end of the power receiving coil 31 is positive as illustrated in FIG. 16B, current flows from the power receiving coil 31 through a body diode of the FET Q2 to the capacitor 51. Thus, the capacitor 51 is charged.

In the normal power-reception time, the state illustrated in FIG. 16A and the state illustrated in FIG. 16B are alternately repeated, outputting a received voltage to the rectifier circuit 52.

Figure 17A:
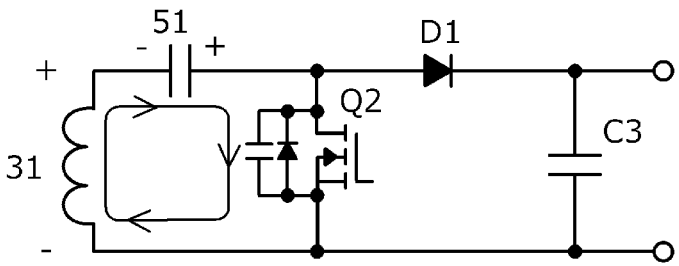
FIGS. 17A and 17B are diagrams for explaining an operation of the cutoff circuit in a state in which a received voltage exceeds a specified value.
Figure 17B:
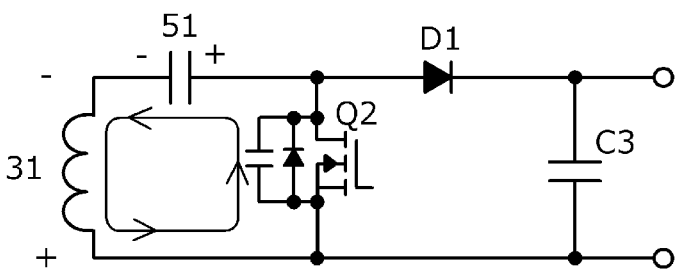

FIGS. 17A and 17B are diagrams for explaining an operation of the cutoff circuit 58C in a state in which a received voltage exceeds a specified value. The FET Q2 shifts to an on state in response to the detection signal outputted from the received voltage detection circuit 58D illustrated in FIG. 15.

When a voltage is induced by the power receiving coil 31 and the first end of the power receiving coil 31 becomes positive as illustrated in FIG. 17A, current flows in a path along the capacitor 51 and the FET Q2 from the power receiving coil 31. When the second end of the power receiving coil 31 is positive as illustrated in FIG. 17B, current flows from the power receiving coil 31 through the body diode of the FET Q2 to the capacitor 51. In the state in which the received voltage exceeds the specified value, the state illustrated in FIG. 17A and the state illustrated in FIG. 17B are alternately repeated. That is, a received voltage is not outputted to the rectifier circuit 52.

Accordingly, even if the power receiving coil 31 receives a magnetic field that is larger than a specified value, power can be cut off by cutting off power reception of the rectifier circuit 52, being able to suppress an influence of heat generation and the like caused by high power reception in the rectifier circuit 52 and circuits on the following stages.

Figure 18A:
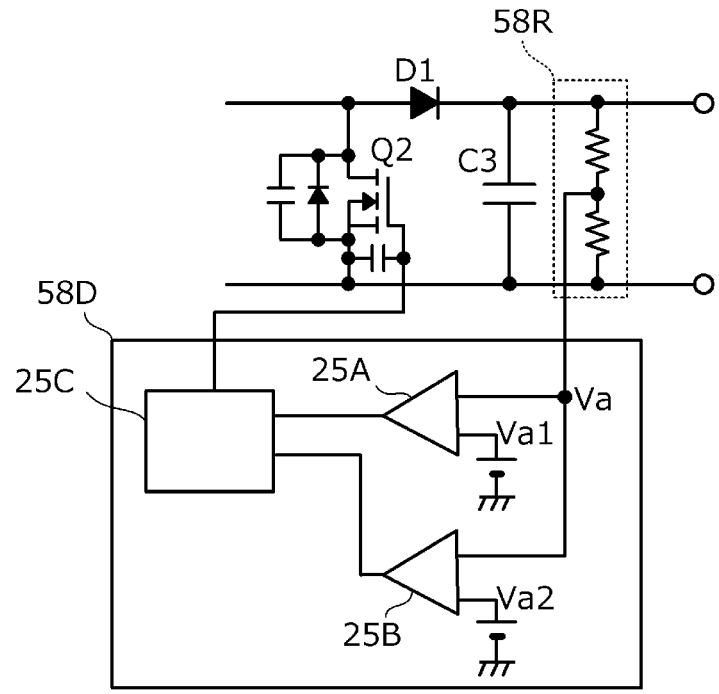
FIGS. 18A and 18B are diagrams illustrating configuration examples of a received voltage detection circuit illustrated in FIG. 15.
Figure 18B:
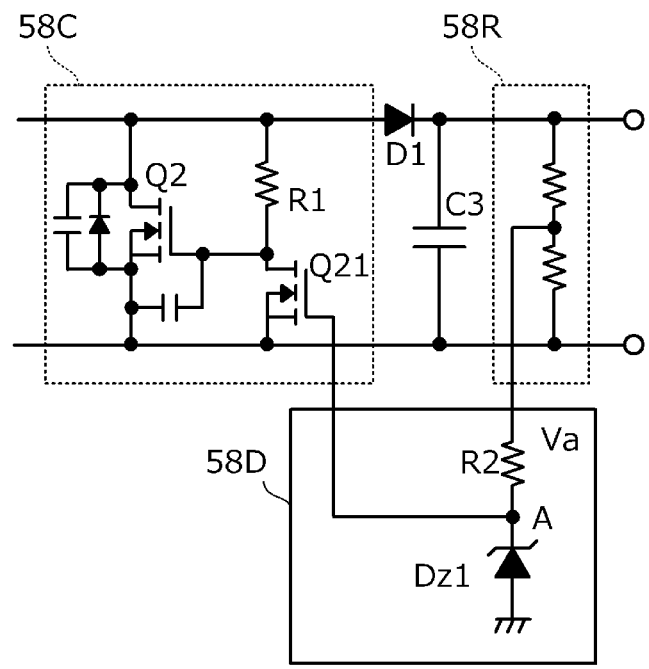

FIGS. 18A and 18B are diagrams illustrating configuration examples of the received voltage detection circuit 58D illustrated in FIG. 15.

In the example illustrated in FIG. 18A, the received voltage detection circuit 58D includes comparators 25A and 25B and a control unit 25C. The comparator 25A compares a received voltage Va with a threshold voltage Va1. The comparator 25A outputs an H level signal (H) when Va>Va1 is established, and the comparator 25A outputs an L level signal (L) when Va≤Va1 is established. The comparator 25B compares the received voltage Va with a threshold voltage Va2. The comparator 25B outputs the H level signal (H) when Va>Va2 is established, and the comparator 25B outputs the L level signal (L) when Va≤Va2 is established.

The control unit 25C outputs a gate signal to the FET Q2 based on output signals of the comparators 25A and 25B. In detail, when both of the output signals of the comparators 25A and 25B are L, namely, when Va<Va1 is established, the control unit 25C turns off the FET Q2. When the output signal of the comparator 25A is H and the output signal of the comparator 25B is L, namely, when Va1<Va<Va2 is established, the control unit 25C outputs a pulse signal to a gate of the FET Q2 so as to turn on and off the FET Q2. When both of the output signals of the comparators 25A and 25B are H, namely, when Va2<Va is established, the control unit 25C turns on the FET Q2.

In the example illustrated in FIG. 18B, the cutoff circuit 58C includes a series circuit for driving the FET Q2. The series circuit is composed of a resistance R1 and a FET Q21. A connection point between the resistance R1 and the FET Q21 is connected to the gate of the FET Q2.

The cutoff circuit 58C illustrated in FIG. 18B includes the resistance R2 and the FET Q21. The received voltage detection circuit 58D includes a series circuit composed of the resistance R2 and a Zener diode Dz1. A connection point A between the resistance R2 and the Zener diode Dz1 is connected to the gate of the FET Q21.

When the received voltage Va is lower than the Zener voltage of the Zener diode Dz1 in this configuration, a potential of the connection point A is H and the FET Q21 is turned on. Accordingly, a potential of a connection point between the resistance R1 and the FET Q21 is L and the FET Q2 is turned off. When the received voltage Va rises and exceeds the Zener voltage, the potential of the connection point A becomes L and the FET Q21 is turned off and the FET Q2 is turned on. The Zener voltage is set so that the FET Q2 is turned off when the received voltage Va is equal to or lower than the threshold voltage Va1.

When the received voltage Va exceeds the Zener voltage and the FET Q2 is turned on, a power reception cutoff state starts. Accordingly, the capacitor C3 discharges and the received voltage Va is lowered. When the received voltage Va becomes to be lower than the Zener voltage, the potential of the connection point A becomes H and the FET Q2 is turned off again. Then, when the received voltage Va exceeds the Zener voltage again, the FET Q2 is turned on. This process is repeated and excessive received voltage is suppressed.

When the received voltage Va is higher than a specified value (when equal to or higher than the threshold voltage Va2), the FET Q2 is turned on and the power reception cutoff state starts. The cutoff circuit 58C maintains the cutoff state and power reception is stopped until the received voltage Va becomes to be lower than the Zener voltage.

Figure 19:
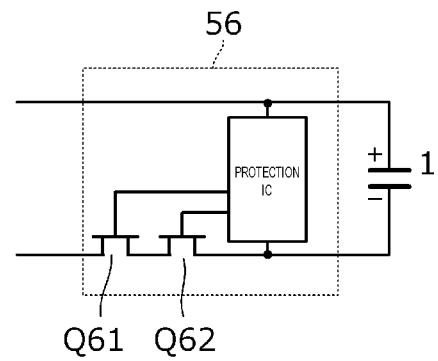
FIG. 19 is a circuit diagram illustrating a specific example of a protection circuit.

FIG. 19 is a circuit diagram illustrating a specific example of the protection circuit 56. The protection circuit 56 is composed of a protection IC and FETs Q61 and Q62. The protection IC detects both end voltages of the solid-state battery 1. When an applied voltage of the solid-state battery 1 exceeds a prescribed voltage, the protection IC controls gate voltages of the FETs Q61 and Q62 and cuts off a charging current path to the solid-state battery 1.

Sixth Embodiment

A sixth embodiment will describe an example of a circuit that cuts off power reception by controlling a rectifying element.

Figure 20:
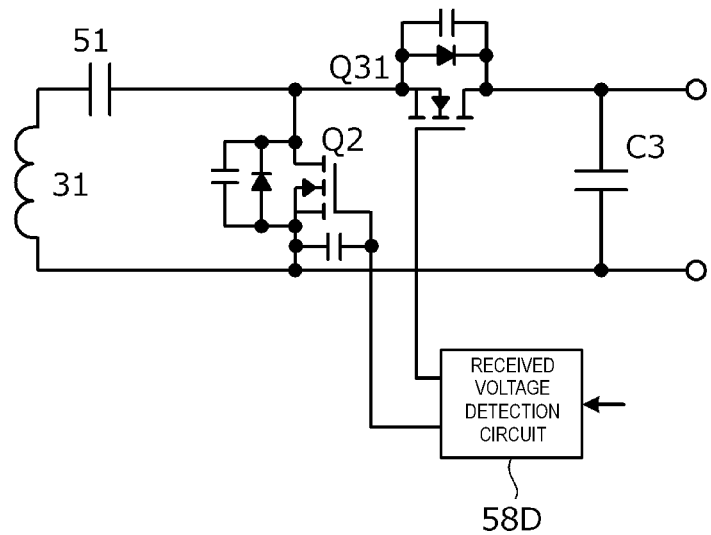
FIG. 20 is a diagram illustrating a configuration of a cutoff circuit of a wireless rechargeable solid-state battery module according to a sixth embodiment.
Figure 21:
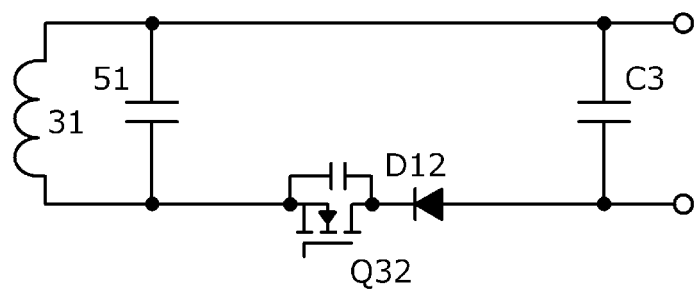
FIG. 21 is a diagram illustrating a configuration of a cutoff circuit of another wireless rechargeable solid-state battery module according to the sixth embodiment.

FIG. 20 and FIG. 21 are diagrams illustrating configurations of a cutoff circuit of a wireless rechargeable solid-state battery module according to the sixth embodiment. In FIG. 20, the FET Q2 and a FET Q31 constitute a synchronous rectifier circuit. The received voltage detection circuit 58D controls the FETs Q2 and Q31 so as to control a synchronous rectification operation. That is, in conducting power reception cutoff, the FET Q2 is shifted to the on state and the FET Q31 is shifted to the off state.

In FIG. 21, a FET Q32 and a diode D12 constitute a rectifier circuit. The received voltage detection circuit 58D controls the FET Q32 so as to control a rectification operation. That is, in conducting power reception cutoff, the FET Q32 is shifted to the off state.

Seventh Embodiment

A seventh embodiment will describe a configuration example of a power reception protection circuit provided with a bridge rectifier circuit.

Figure 22:
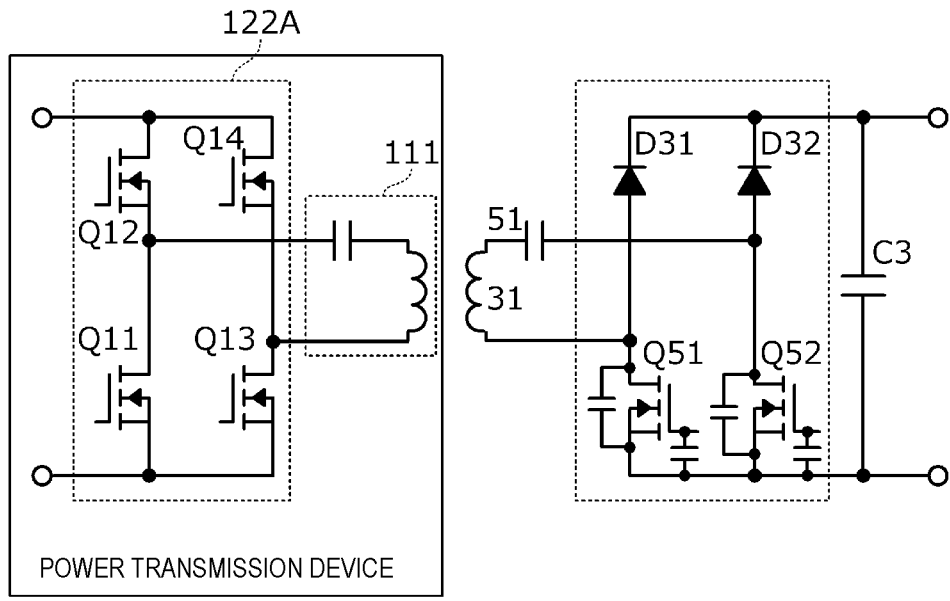
FIG. 22 is a circuit diagram partially illustrating a wireless rechargeable solid-state battery module and a power transmission device according to a seventh embodiment.
Figure 23:
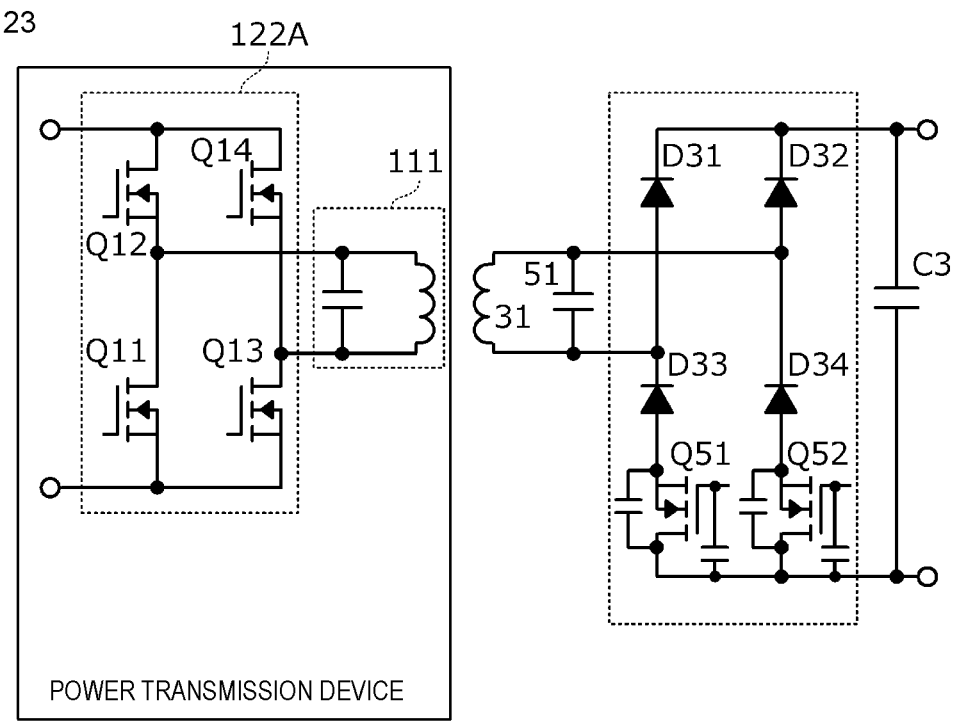
FIG. 23 is a circuit diagram partially illustrating another wireless rechargeable solid-state battery module and a power transmission device according to an seventh embodiment.

FIG. 22 and FIG. 23 are circuit diagrams partially illustrating a wireless rechargeable solid-state battery module and a power transmission device according to the seventh embodiment.

Referring to FIG. 22, the power transmission device includes a power transmission-side resonant circuit 111 and a power transmission circuit 122A. The power transmission circuit 122A is configured in a manner such that a series circuit composed of FETs Q11 and Q12 and a series circuit composed of FETs Q13 and Q14 are connected in parallel. A DC voltage from a DC power supply is converted into an AC voltage by alternately turning on and off the FETs Q11 and Q14 and the FETs Q12 and Q13 and the AC voltage is supplied to the power transmission-side resonant circuit 111.

In FIG. 22, a rectifier circuit is configured in a manner such that a series circuit composed of a FET Q51 and a diode D31 and a series circuit composed of a FET Q52 and a diode D32 are connected in parallel. The received voltage detection circuit 58D (FIG. 15) performs switching control with respect to the FETs Q51 and Q52.

Referring to FIG. 23, a diode bridge rectifier circuit composed of diodes D31, D32, D33, and D34 and the FETs Q51 and Q52 are provided. This configuration is different from the example illustrated in FIG. 22 in the directions of drains and sources of the FETs Q51 and Q52.

In either of the examples illustrated in FIGS. 21 and 22, the FETs Q51 and Q52 are shifted to the off state and rectification by the diodes D31, D32, D33, and D34 is blocked in conducting power reception cutoff.

Finally, the description of the embodiments described above is exemplary in all aspects and not restrictive. Those skilled in the art can appropriately make modifications and changes. The scope of the present disclosure is indicated by the claims rather than the embodiments described above. Further, the scope of the present disclosure includes changes from the embodiments within the scope equivalent to the scope of the claims.

What is claimed is:

1. A wireless rechargeable solid-state battery module comprising:
   a solid-state battery;
   an internal structure including an internal circuit electrically connected with the solid-state battery;
   a positive electrode terminal and a negative electrode terminal, each of which is electrically connected with the solid-state battery, is exposed on an outer surface, and is arranged so that the positive electrode terminal or the negative electrode terminal is configured to mount on a component mounting circuit board; and
   a barrier layer that isolates the solid-state battery from an outside air environment, wherein
   the internal circuit includes a wireless charging circuit that receives power from an outside via an electromagnetic field or a magnetic field produced by power transmission from the outside and performs charging control of the solid-state battery;

the wireless charging circuit is connected between the solid-state battery and the positive electrode terminal and between the solid-state battery and the negative electrode terminal; and the barrier layer is over at least a portion of a surface of the internal structure that faces the solid-state battery and is inside the wireless rechargeable solid-state battery module.

2. The wireless rechargeable solid-state battery module according to claim 1, wherein the internal circuit includes an output voltage stabilization circuit that is connected between the solid-state battery and the positive electrode terminal and between the solid-state battery and the negative electrode terminal and is configured to stabilize a discharging voltage of the solid-state battery.

3. The wireless rechargeable solid-state battery module according to claim 1, wherein the internal circuit includes a protection circuit configured to perform protection against at least one of overcurrent, overvoltage, and overheat in charging/discharging of the solid-state battery.

4. The wireless rechargeable solid-state battery module according to claim 1, further comprising:

a buffer layer configured to suppress peeling of the barrier layer between the barrier layer and the internal structure.

5. The wireless rechargeable solid-state battery module according to claim 1, further comprising:

an impact absorbing member configured to mold a periphery of the solid-state battery.

6. The wireless rechargeable solid-state battery module according to claim 1, wherein the wireless charging circuit includes a power receiving coil configured to receive the electromagnetic field or the magnetic field produced by power transmission from the outside, a rectifier circuit configured to rectify induced current of the power receiving coil, a voltage conversion circuit configured to convert an output voltage of the rectifier circuit so as to generate a charging voltage, and a charge control circuit configured to input an output voltage of the voltage conversion circuit so as to perform charging control of the solid-state battery.

7. The wireless rechargeable solid-state battery module according to claim 6, wherein the wireless charging circuit includes a resonant capacitor that is connected with the power receiving coil and configures a resonant circuit together with the power receiving coil.

8. The wireless rechargeable solid-state battery module according to claim 7, further comprising:

a charging input terminal that is exposed on an outer surface facing an input unit of the rectifier circuit or an input unit of the voltage conversion circuit.

9. The wireless rechargeable solid-state battery module according to claim 7, wherein the charge control circuit includes a monitor signal output unit configured to output a signal indicating a charging control state with respect to the solid-state battery, and the wireless rechargeable solid-state battery module further comprises:

a charging state monitoring terminal connected with the monitor signal output unit is provided.

10. The wireless rechargeable solid-state battery module according to claim 7, further comprising:

a signal transmission circuit configured to transmit a signal in response to change of power consumption of a circuit connected with the power receiving coil.

11. The wireless rechargeable solid-state battery module according to claim 7, further comprising:

a signal transmission circuit configured to transmit a signal in response to change of a resonance condition of the resonant circuit.

12. The wireless rechargeable solid-state battery module according to claim 6, further comprising:

a power reception protection circuit configured to stop power reception of the rectifier circuit when a received voltage of the rectifier circuit exceeds a prescribed voltage range.

13. The wireless rechargeable solid-state battery module according to claim 1, wherein the internal structure comprises a first circuit board and a second circuit board that sandwich the solid-state battery in a laminating direction thereof.

14. The wireless rechargeable solid-state battery module according to claim 13, wherein the positive electrode terminal and the negative electrode terminal are exposed on an outer surface of the first circuit board and a mold resin layer is provided on an outer surface side of the second circuit board.

15. The wireless rechargeable solid-state battery module according to claim 2, wherein the internal circuit includes a protection circuit configured to perform protection against at least one of overcurrent, overvoltage, and overheat in charging/discharging of the solid-state battery.

16. The wireless rechargeable solid-state battery module according to claim 2, further comprising:

a buffer layer configured to suppress peeling of the barrier layer between the barrier layer and the internal structure.

17. The wireless rechargeable solid-state battery module according to claim 2, further comprising:

an impact absorbing member configured to mold a periphery of the solid-state battery.

18. The wireless rechargeable solid-state battery module according to claim 2, wherein the wireless charging circuit includes a power receiving coil configured to receive the electromagnetic field or the magnetic field produced by power transmission from the outside, a rectifier circuit configured to rectify induced current of the power receiving coil, a voltage conversion circuit configured to convert an output voltage of the rectifier circuit so as to generate a charging voltage, and a charge control circuit configured to input an output voltage of the voltage conversion circuit so as to perform charging control of the solid-state battery.

19. The wireless rechargeable solid-state battery module according to claim 8, wherein the charge control circuit includes a monitor signal output unit configured to output a signal indicating a charging control state with respect to the solid-state battery, and the wireless rechargeable solid-state battery module further comprises:

a charging state monitoring terminal connected with the monitor signal output unit is provided.

20. The wireless rechargeable solid-state battery module according to claim 8, further comprising:

a signal transmission circuit configured to transmit a signal in response to change of power consumption of a circuit connected with the power receiving coil.

21. The wireless rechargeable solid-state battery module according to claim 1, wherein
the barrier layer is on an upper side of the circuit board on which the solid-state battery is mounted.

22. The wireless rechargeable solid-state battery module according to claim 1, wherein
the barrier layer is on an underside of the circuit board on which the solid-state battery is mounted.

23. The wireless rechargeable solid-state battery module according to claim 1, wherein
the barrier layer is on both sides of the circuit board on which the solid-state battery is mounted.

24. The wireless rechargeable solid-state battery module according to claim 1, wherein
the barrier layer is on an underside of the circuit board which is above the solid-state battery.

* * * * *